(12) United States Patent
Kawasaki

(10) Patent No.: US 6,807,014 B2
(45) Date of Patent: Oct. 19, 2004

(54) ZOOM PHOTOGRAPHIC OPTICAL SYSTEM

(75) Inventor: Kenji Kawasaki, Hachioji (JP)

(73) Assignee: Olympus Corporation, Tokyo (JP)

(*) Notice: Subject to any disclaimer, the term of this patent is extended or adjusted under 35 U.S.C. 154(b) by 0 days.

(21) Appl. No.: 10/740,402

(22) Filed: Dec. 22, 2003

(65) Prior Publication Data
US 2004/0156118 A1 Aug. 12, 2004

(30) Foreign Application Priority Data
Aug. 8, 2002 (JP) .................................. 2002-230712

(51) Int. Cl.[7] .............................................. G02B 15/14
(52) U.S. Cl. ................................. 359/687; 359/683
(58) Field of Search ............................. 359/687, 683

(56) References Cited

U.S. PATENT DOCUMENTS 4,094,586 A * 6/1978 Sato et al. ................. 359/683
6,249,389 B1 * 6/2001 Ohtake ..................... 359/684

* cited by examiner

Primary Examiner—Scott J. Sugarman
(74) Attorney, Agent, or Firm—Kenyon & Kenyon

(57) ABSTRACT

A zoom photographic optical system having a broad varifocal range which comprises, in order from a side of an objective lens system, at least a first positive lens unit, a second negative lens unit and a third positive lens unit, moves the second lens unit and the third lens unit for changing a magnification from a low magnification position to a high magnification position so that an airspace between the first lens unit and the second lens unit at the high magnification position is shorter than that at the low magnification position and an airspace between the second lens unit and the third lens unit at the high magnification position is longer than that the low magnification position, forms an intermediate image between the first lens unit and the second lens unit at the low magnification position, and satisfies the following conditions (1) and (2):

$$1 \leq FH/FL \leq 3 \quad (1)$$

$$3 \leq MGH/MGL \leq 20 \quad (2)$$

9 Claims, 28 Drawing Sheets

ZOOM PHOTOGRAPHIC OPTICAL SYSTEM

BACKGROUND OF THE INVENTION a) Field of the Invention

The present invention relates to a zoom photographic optical system which is to be used in an optical apparatus equipped with an objective lens system for microscope and capable of changing a size of a specimen image to be formed on an image pickup device.

b) Description of the Prior Art

A conventional optical apparatus such as a microscope permits carrying out observation and photographing in procedures described below. First, a specimen is searched for a location to be observed in a broad visual field with an objective lens system having a low magnification. Then, the objective lens system is exchanged (replaced) with an objective lens system having a high magnification and an image of an object (the specimen) is magnified. The magnified image of the object is observed as it is or photographed using an image pickup apparatus. Magnification levels range from 1× or so to 100×. Various methods have been proposed for observing and photographing objects in such a wide magnification range.

As conventional examples of photographic lens system which projects a specimen image formed by a microscope to a silver salt film or the like, there are known photographic lens systems for microscope which are disclosed by Japanese Patent Kokai Publication No. Hei 5-119265, No. Hei 6-281865 and No. Hei 10-62692. The photographic lens systems for microscope disclosed by these patents have magnifications of 2× to 5×.

Furthermore, known as photographic lens systems having low magnifications and vari-focal lens systems for TV photographing are vari-focal lens systems which are capable of photographing at magnifications from 0.25× to 4× or so in combination with imaging lens systems.

Furthermore, known as conventional examples of imaging lens system which is disposed after an objective lens system for microscope and configured as a zoom lens system are lens systems disclosed by Japanese Patents Kokai Publication No. Hei 4-304409, No. Hei 9-274137 and No. Hei 7-56087. Furthermore, known as conventional examples of optical system which splits a light bundle emerging from an objective lens system and uses photographic optical systems having different magnifications and disposed in split light bundles are optical systems disclosed by Japanese Patents Kokai Publication No. Hei 8-190056 and No. Hei 11-183124.

Furthermore, there is known a method for observing and photographing an image of an object using an a focal zoom lens system for stereoscopic microscope.

Out of the conventional examples mentioned above, the photographic optical systems disclosed by Japanese Patents Kokai Publication No. Hei 5-119265, No. Hei 6-281865 and No. Hei 10-62692 have fixed photographic magnifications. Accordingly, these optical systems require exchanging photographic optical systems which are disposed in photographic optical paths with photographic optical systems having different magnifications when objects are to be photographed at different magnifications, thereby being low in operability.

Furthermore, out of the conventional examples mentioned above, the optical systems disclosed by Japanese Patent Kokai Publication No. Hei 4-304409 and No. Hei 9-274137 use imaging lens systems which are to be disposed after objective lens systems and configured as zoom lens system. These conventional optical systems have a merit to permit continuously changing photographic magnifications with the imaging lens systems (zoom lens systems). However, these optical system do not permit observations and photographing at low magnifications since the optical systems are configured as vari-focal systems for enhancing magnifications. Furthermore, the optical systems have low vari-focal ratios of 2 to 3.

Furthermore, the optical system disclosed by Japanese Patent Kokai Publication No. Hei 7-84189 is a zoom lens system having a vari-focal ratio on the order of 10. However, this zoom lens system is not so preferable since the zoom lens system allows a location of an exit pupil to be varied. Furthermore, the zoom lens system has a large numerical aperture on an exit side at a low magnification since a pupil of an objective lens system is not located in the zoom lens system. As a result, a marginal portion is remarkably eclipsed on an image surface. Furthermore, the zoom lens system has a numerical aperture on the order of only 0.6 at a high magnification and is not so sufficient in resolution. Furthermore, the zoom lens system has a long back focal length, thereby enlarging an optical apparatus.

Furthermore, each of the conventional examples disclosed by Japanese Patents Kokai Publication No. Hei 8-190056 and No. Hei 11-183124 are configured to split an optical path into an optical path on a low magnification side and an optical path on a high magnification side. Accordingly, these conventional example have a merit to facilitate switching between a low magnification and a high magnification. However, these conventional example are configured for observations at fixed magnifications and low in operability.

SUMMARY OF THE INVENTION

An object of the present invention is to provide a zoom photographic optical system which has a broad vari-focal range from a magnification lower than a magnification of an objective lens system to a magnification exceeding 10×. Another object of the present invention is to provide a zoom optical system which is capable of limiting a size of a light bundle at a low magnification. Still another object of the present invention is to provide a zoom photographic optical system which suppresses a variation of an exit pupil.

A zoom photographic optical system according to the present invention is an optical system which is to be used in an optical apparatus equipped with an objective lens system for forming a final image of a specimen, comprises, in order from a side of the objective lens system, a first lens unit having positive refractive power, a second lens unit having negative refractive power and a third lens unit having positive refractive power, changes a magnification from a low magnification position to a high magnification position by moving the above described second lens unit and third lens unit along an optical axis so that an airspace between the first lens unit and the second lens unit at the high magnification position is narrower than that at the low magnification position and an airspace between the second lens unit and the third lens unit at the high magnification position is longer than that at the low magnification position, forms an intermediate image between the first lens unit and the second lens unit at the low magnification position, and satisfies the following conditions (1) and (2).

$$1 \leq FH/FL \leq 3 \tag{1}$$

$$3 \leq MGH/MGL \leq 20 \tag{2}$$

wherein a reference symbol FH represents a focal length of lens units as a whole as counted from the first lens unit to another lens unit located just before the intermediate image at the high magnification position, a reference symbol FL designates a focal length of lens units as a whole as counted from the first lens unit to another lens unit located just before the intermediate image at the low magnification position, a reference symbol MGH denotes a magnification of lens units as a whole which are located between the intermediate image and a final image at the high magnification position, and a reference symbol MGL represents a magnification of lens units as a whole which are located between the intermediate image and the final image at the low magnification position.

Moreover, the zoom photographic optical system according to the present invention further satisfies the following conditions (3), (4) and (5):

$$0.3 < D_1/D_0 < 0.7 \quad (3)$$

$$0.15 < D_2/D_0 < 0.7 \quad (4)$$

$$0 < FB/D_0 < 0.3 \quad (5)$$

wherein a reference symbol $D_0$ represents a distance as measured from a surface of the first lens unit which is nearest the objective lens system to the final image, a reference symbol $D_1$ designates a distance as measured from the surface of the first lens unit which is the nearest the objective lens system to the intermediate image at the low magnification position, a reference symbol $D_2$ denotes a distance for which the second lens unit is moved to change the magnification from the low magnification position to the high magnification position, and a reference symbol FB represents a distance as measured from a surface of a lens element which is nearest the final image to the final image.

Furthermore, the zoom photographic optical system according to the present invention is configured to form an image conjugate with a pupil of the objective lens system at a location between the above described intermediate image and final image, locate an aperture stop at a location of the above described conjugate image, and vary a diameter of the above described aperture stop,

DETAILED DESCRIPTION OF THE PREFERRED EMBODIMENTS

Figure 1A:
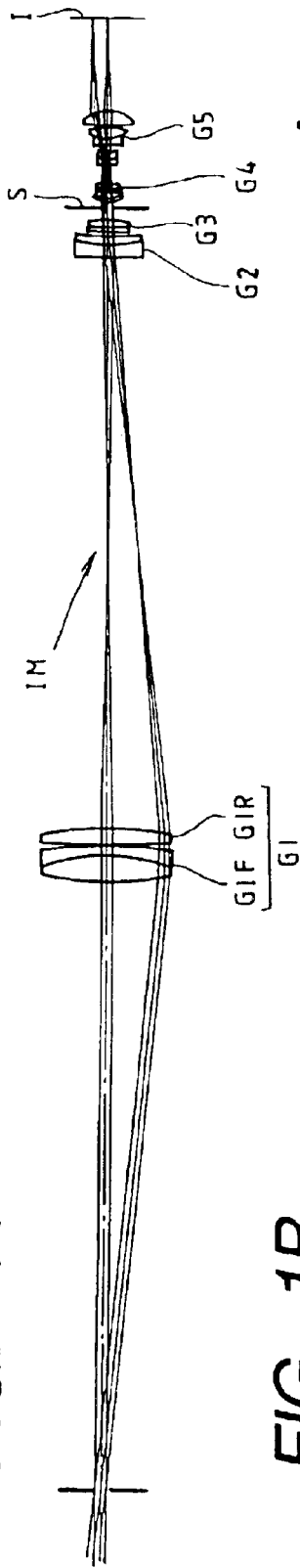
FIG. 1A, FIG. 1B and FIG. 1C are sectional views showing a composition of a first embodiment of the present invention.

A zoom photographic optical system according to the present invention comprises, in order from a side of an objective lens system, at least a first lens unit having positive refractive power, a second lens unit having negative refractive power and a third lens unit having positive refractive power as described above, changes a magnification from a low magnification position to a high magnification position by moving the second lens unit and the third lens unit along an optical axis so that an airspace between the first lens unit and the second lens unit at the high magnification position is shorter than that at the low magnification position and an airspace between the second lens unit and the third lens unit at the high magnification position is longer than that at the low magnification position. Description will be made of function of the lens units of the zoom photographic optical system according to the present invention. The zoom photographic optical system according to the present invention may be used in combination with an optical apparatus such as a microscope. The optical apparatus is assumed to have an objective lens system of a type which corrects aberrations at an infinite distance. The zoom photographic optical system according to the present invention is disposed after this objective lens system. A light bundle emerging from this objective lens system of the type which correct aberrations at the infinite distance is a light bundle which is converged at the infinite distance (parallel light bundle). When the zoom photographic optical system according to the present invention is combined with such an objective lens system, a total photographic magnification of the objective lens system and the zoom photographic optical system according to the present invention is therefore determined by a focal length of the zoom photographic optical system according to the present invention and a focal length of the objective lens system.

In the zoom photographic optical system according to the present invention, the first lens unit having the positive refractive power functions to converge an incident light bundle which is converged at the infinite distance. Furthermore, the second lens unit having the negative refractive power functions to diverge a light bundle coming from the first lens unit. Furthermore, the third lens unit or lens units on and after the third lens unit as a whole has or have positive power as a whole and condenses or condense a light bundle coming from the second lens unit on a predetermined location by a converging function. The zoom photographic optical system according to the present invention is configured to form an intermediate image between the first lens unit and the second lens unit at the low magnification position. Furthermore, the zoom photographic optical system according to the present invention is configured to form an image conjugate with a pupil of the objective lens system (hereinafter referred to as a conjugate image of the pupil) at allocation between the intermediate image and the final image. Furthermore, the optical system is configured to form the conjugate image of the pupil at a predetermined location between the above described location of the intermediate image and a lens unit which is located nearest the final image (hereinafter referred to as a final lens unit).

The zoom photographic optical system according to the present invention satisfies the following conditions (1) and (2):

$$1 \leq FH/FL \leq 3 \quad (1)$$

$$3 \leq MGH/MGL \leq 20 \quad (2)$$

wherein a reference symbol FH represents a focal length of lens units as a whole as counted from the first lens unit to another lens unit located just before the intermediate image at the high magnification position, a reference symbol FL designates a focal length of lens units as a whole as counted from the first lens unit to another lens unit located just before the intermediate image at the low magnification, a reference symbol MGH denotes a magnification of lens units as a whole located between the intermediate image and the final image at the high magnification position and a reference symbol MGL represents a magnification of lens units as a whole located between the intermediate image and the final image at the low magnification position.

If a lower limit of the condition (1) is exceeded, FL will be longer than FH. In this case, the second lens unit having the negative refractive power will be moved toward the first lens unit from the location of the intermediate image at the low magnification position. Accordingly, it is impossible to compose the zoom photographic optical system. If a lower limit of the condition (2) is exceeded, on the other hand, it will be impossible to obtain a required vari-focal ratio. When the above-mentioned conditions are satisfied, it is possible to carry out photographing within a magnification range effective for practical use by making use of resolution of the objective lens system and without lowering brightness of an image.

When the zoom photographic optical system is composed of three lens units, a first lens unit having positive refractive power, a second lens unit having negative refractive power and a third lens unit having positive refractive power are disposed in order from the side of the objective lens system. In this composition, the second lens unit which is a moving lens unit mainly has a vari-focal function, whereas the third lens unit which is another moving lens unit functions to move a principal point of an optical system located between the intermediate image and the final image.

In other words, the locations of the second and third lens units are set at the low magnification position so that lens units which are located between the intermediate image and the final image has a contracting magnification as a whole. Accordingly, the zoom photographic optical system according to the present invention is configured to shift the principal point of the optical system which is located between the intermediate image and the final image toward the final image when the magnification is changed from the high magnification position to the low magnification position. Furthermore, locations of the second and third lens units are set at the high magnification position so that the lens units located between the intermediate image and the final image have an enlarging magnification as a whole. Accordingly, the zoom photographic optical system according to the present invention is configured to shift the principal point of the optical system located between the intermediate image and the final image toward the intermediate image when the magnification is changed from the low magnification position to the high magnification position.

Accordingly, the zoom photographic optical system according to the present invention is configured to move the second lens unit and the third lens unit along an optical axis so that an airspace between the first lens unit and the second lens unit is prolonged and an airspace between the second lens unit and the third lens unit is shortened for changing a magnification toward the low magnification position. Furthermore, the zoom photographic optical system according to the present invention forms the intermediate image as a conjugate image of an object between the first lens unit and the second lens unit as described above.

Furthermore, the zoom optical system according to the present invention moves the second lens unit and the third lens unit so that the airspace between the first lens unit and the second lens unit is shortened and the airspace between the second lens unit and the third lens unit is prolonged for changing a magnification toward the high magnification position. When the second lens unit is moved toward the objective lens system beyond a rear focal point of the first lens unit, a location of the intermediate image at the high magnification position is different from that at the low magnification position.

When a focal length of the zoom photographic optical system as a whole is represented by FL, a focal length at the low magnification position is designated by FT(L) and a focal length at the high magnification position is denoted by FT(H), FT(L) and FT(H) are expressed as follows:

$$FT(L)=FL \times MGL$$

$$FT(H)=FH \times MGL$$

Hence, a vari-focal ratio Z is expressed as follows:

$Z=FT(H)/FT(L)$ $=(FH/FL)\times(MGH/MGL)$

In other words, a vari-focal ratio Z of the zoom photographic optical system can be expressed as a product of the condition (1) and the condition (2).

The zoom photographic optical system according to the present invention comprises, in order from a side of an objective lens system, at least a first lens unit having positive refractive power a second lens unit having negative refractive power and a third lens unit having positive refractive power as described above. When a lens unit or lens units is or are to be disposed on the image side of the third lens unit in the zoom photographic optical system according to the present invention which has the above described composition, it is desirable to compose the optical system as described below.

When a lens unit is to be disposed in succession to the third lens unit, it is desirable to dispose a fourth lens unit having positive refractive power. And it is desirable to configure the optical system so that an airspace between the third lens unit and the fourth lens unit is first prolonged and shortened on the way for changing a magnification from the low magnification position to the high magnification position.

Speaking concretely of a case where the zoom photographic optical system according to the present invention is to be composed of four lens units, a first lens unit having positive refractive power, a second lens unit having negative refractive power, a third lens unit having positive refractive power and a fourth lens unit having positive refractive power are disposed in order from the side of the objective lens system. The optical system is configured to change a magnification from a low magnification position to a high magnification position by moving the second, third and fourth lens units along an optical axis respectively so that an airspace between the first lens unit and the second lens unit is shortened and an airspace between the third lens unit and the fourth lens unit is first prolonged and then shortened. The optical system is configured to form an intermediate image between the first lens unit and the second lens unit at the low magnification position, and satisfy the above-mentioned conditions (1) and (2).

When a lens unit is to be disposed in succession to the third lens unit, another composition may be selected using a fourth lens unit having negative refractive power. For changing a magnification from a low magnification position to a high magnification position, it is desirable to prolong an airspace between the third lens unit and the fourth lens unit.

Speaking more concretely of a case where the zoom photographic optical system according to the present invention is to be composed of four lens units, a first lens unit having positive refractive power, a second lens unit having negative refractive power, a third lens unit having positive refractive power and a fourth lens unit having negative refractive power are disposed in order from the side of the objective lens system. The optical system is configured to change a magnification from a low magnification position to a high magnification position by moving the second, third and fourth lens units along an optical axis respectively so that an airspace between the first lens unit and the second lens unit is first prolonged and then shortened, an airspace between the second lens unit and the third lens unit is first shortened and then prolonged, and an airspace between the third lens unit and the fourth lens unit is prolonged. The optical system is configured to form an intermediate image between the first lens unit and the second lens unit at the low magnification position, and satisfy the above-mentioned conditions (1) and (2).

Furthermore, when two lens units are to be disposed in succession to the third lens unit, it is preferable to select a composition in which a fourth lens unit having positive refractive power and a fifth lens unit having positive or negative refractive power are disposed in order from the third lens unit. For changing a magnification from a low magnification position to a high magnification position, it is desirable to move the added lens units so that an airspace between the third lens unit and the fourth lens unit is first prolonged and then shortened, and an airspace between the fourth lens unit and the fifth lens unit is prolonged.

Speaking more concretely of a case in which the zoom photographic optical system according to the present invention is to be composed of five lens units, a first lens unit having positive refractive power, a second lens unit having negative refractive power, a third lens unit having positive refractive power, a fourth lens unit having positive refractive power and a fifth lens unit having positive refractive power are disposed in order from the side of the objective lens system. The optical system is configured to change a magnification from a low magnification position to a high magnification position by moving the second, third and fourth lens units along an optical axis respectively so that an airspace between the first lens unit and the second lens unit is shortened, an airspace between the second lens unit and the third lens unit is prolonged, an airspace between the third lens unit and the fourth lens unit is first prolonged and then shortened, and an airspace between the fourth lens unit and the fifth lens unit is prolonged. The optical system is configured to form an intermediate image between the first lens unit and the second lens unit, and satisfy the above-mentioned conditions (1) and (2).

In another case in which the zoom optical system according to the present invention is to be composed of five lens units, a first lens unit having positive refractive power, a second lens unit having negative refractive power, a third lens unit having positive refractive power, a fourth lens unit having positive refractive power and a fifth lens unit having negative refractive power are disposed in order from the side of the objective lens system. The optical system is configured to change a magnification from a low magnification position to a high magnification position by moving the second, third and fourth lens units along an optical axis respectively so that an airspace between he first lens unit and the second lens unit is shortened an airspace between the second lens unit and the third lens unit is prolonged, an airspace between the third lens unit and the fourth lens unit is first prolonged and the shortened, and an airspace between the fourth lens unit and the fifth lens unit is prolonged. The optical system is configured to form an intermediate image between the first lens unit and the second lens unit at the low magnification position, and satisfy the above-mentioned conditions (1) and (2).

Furthermore, it is desirable that the zoom photographic optical system according to the present invention which has each of the above described compositions satisfies the following conditions (3), (4) and (5):

$0.3<D_1/D_0<0.7$ (3)

$0.15<D_2/D_0<0.7$ (4)

$0<FB/D_0<0.3$ (5)

wherein a reference symbol $D_0$ represents a distance as measured from a surface of the first lens unit whichever is nearest the objective lens system to the final image, a reference symbol $D_1$ designates a distance as measured from the surface of the first lens unit whichever is nearest the objective lens system to the intermediate image at the low magnification position, a reference symbol $D_2$ denotes a distance for which the second lens unit is moved to change the magnification from the low magnification position to the high magnification position and a reference symbol FB represents a distance as measured from a surface, on a side of the final image, of a lens element whichever is located nearest the final image to the final image.

When the zoom photographic optical system according to the present invention satisfies the condition (3), the optical system is capable of favorably correcting offaxial aberrations at the low magnification position and spherical aberration at the high magnification position. When the optical system satisfies the condition (4), the optical system can be configured to have a high vari-focal ratio. When the zoom photographic optical system satisfies the condition (5), the optical system can have an adequate back focal length and a compact composition.

If $D_1/D_0$ has a value smaller than a lower limit of 0.3 of the condition (3), a distance as measured from the first lens unit to the intermediate image will be short, thereby strengthening the refractive power of the first lens unit. In this case, an offaxial principal ray will be incident on the second lens unit at a large height at the low magnification position, thereby having a large angle of incidence. Accordingly, the offaxial aberrations and pupil aberration will unpreferably be aggravated at the low magnification position. If $D_1/D_0$ is larger than an upper limit of 0.7 of the condition (3), the power of the first lens unit will be weakened, whereby the distance as measured from the intermediate image to the final image will be too short. Accordingly, moving spaces for the second lens unit and the third lens unit will be narrow in case of the photographic optical system consisting of the three lens units. In case of the photographic optical system consisting of the four or five lens units, moving spaces for the second lens unit, the third lens unit and the fourth lens unit will be narrow. As a result, it will be impossible to obtain a high vari-focal ratio in any case.

If $D_2/D_0$ has a value smaller than a lower limit of 0.15 of the condition (4), the negative power of the second lens unit will be too strong. As a result, astigmatism and coma will be aggravated at the low magnification position, and spherical aberration will be aggravated at the high magnification position. If $D_2/D_0$ has a value larger than an upper limit of 0.7 of the condition (4), in contrast, the negative power of the second lens unit will be weakened. As a result, it will be impossible to obtain a high vari-focal ratio. In addition, a moving distance of the third lens unit or moving distances of the third lens unit and the fourth lens unit will be shortened, thereby making is difficult to keep an image surface at a constant location.

If $FB/D_0$ is smaller than a lower limit of 0 of the condition (5), the final image will be formed at a location close to a final lens unit. Accordingly, compositional interference will take place between the final lens unit and a photographic apparatus at a stage to dispose the photographic apparatus. If $FB/D_0$ is larger than an upper limit of 0.3 of the condition (5), the distance as measured from the first lens unit to the final lens unit will be shortened. As a result, it will be difficult to obtain a high vari-focal ratio.

It is recommended to configure the zoom photographic optical system according to the present invention so as to form an image conjugate with a pupil of the objective lens system (conjugate image of the pupil) between the intermediate image and the final image. It is preferable in this case to dispose an aperture stop at a location of the conjugate image of the pupil or in the vicinity of the image of the pupil and move the aperture stop along the optical axis in conjunction with a change of a magnification. In a case where an aperture stop is disposed at a fixed location, it is recommended to vary a diameter of the aperture stop. The aperture having a variable diameter makes it possible to vary a diameter of a light bundle passing through the objective lens system.

When an aperture stop is disposed at the location of the conjugate image of the pupil or in the vicinity of the conjugate image and the aperture stop has a variable diameter as described above, it is possible to prevent a reduction of light amount and eclipse at a marginal portion by limiting a numerical aperture at the low magnification position. Moreover, it is possible to enhance offaxial aberration correcting performance. Furthermore, it is preferable in a certain case to take preference of reservation of a light amount and less eclipse at the marginal portion over resolution for observation and photography at a low magnification. The above described compositions are effective also from such a viewpoint. Furthermore, it is possible to maintain a constant numerical aperture on a side of a final image surface by varying a diameter of an aperture stop in conjunction with a magnification change. The constant numerical aperture makes it possible to maintain constant brightness during the magnification change.

For the high magnification position at which high resolution is required, on the other hand, it is desired not to limit a numerical aperture. However, an aperture stop may be stopped down in a certain case for observation at a large depth of field. It is therefore preferable that an aperture stop has a variable diameter.

For fixing an aperture stop in an optical path regardless of a magnification change, it is preferable to dispose the aperture stop between the third lens unit and the final lens unit. In this case, an exit pupil is kept at a constant location at all magnifications.

Alternately, it is possible to dispose a plurality of aperture stops between the intermediate image and the final image. An aperture stop which is disposed in the vicinity of the location conjugate with the pupil is appropriately stopped down dependently on magnification change conditions and the other aperture stops are kept open. Even when the location conjugate with the pupil is moved along an optical axis, an aperture of the objective lens system can be limited by selecting appropriate diameters for the plurality of aperture stops.

Furthermore, it is preferable for the above described zoom photographic optical system according to the present invention to compose the first lens unit of a plurality of lens components including at least a cemented lens component consisting of a positive lens element and a negative lens element. Furthermore, it is desirable to compose the final lens unit of a plurality of lens components including a lens element having a concave surface on a side of the intermediate image and negative refractive power.

Furthermore, it is preferable that the zoom photographic optical system having the above described composition satisfies the following conditions (6) and (7):

$$\nu P - \nu N \geq 30 \qquad (6)$$

$$Gn \geq 1.6 \qquad (7)$$

wherein a reference symbol νP represents an Abbe's number of the positive lens element in the cemented lens component of the first lens unit, a reference symbol νN designates an Abbe's number of the negative lens element in the cemented lens component of the first lens unit and a reference symbol Gn denotes a refractive index of the lens element having the concave surface on the side of the intermediate image and the negative refractive power.

When the condition (6) is satisfied, it is possible to favorably correct spherical aberration at the high magnification position and lateral chromatic aberration at the low magnification position. If νP–νN has a value smaller than a lower limit of 30 of the condition (6), it will be difficult to correct spherical aberration at the high magnification position and lateral chromatic aberration at the low magnification position.

When the condition (7) is satisfied, it is possible to correct curvature of field by reducing a Petzval's sum. Furthermore, it is possible to correct coma and astigmatism favorably over an entire zoom range. If a lower limit of Gn is smaller than 1.6 in the condition (7), the lens element having the concave surface on the side of the intermediate image and the negative refractive power will have a small radius of curvature. Accordingly, it will be difficult to correct coma and astigmatism favorably over the entire zoom range.

For a zoom photographic optical system which corrects aberrations by each lens units, it is preferable to compose the optical system not of lens elements but of cemented lens components. The cemented lens components make it possible to correct aberrations favorably over an entire zoom range.

For the zoom photographic optical system according to the present invention, it is desirable that the first lens unit consists of two subunits (a front subunit and a rear subunit) which have positive refractive power, and that an airspace $D_1$, between the two subunits (an airspace between the front subunit and the rear subunit) satisfies the following condition (8):

$$0.3 < D_{11}/D_1 < 0.8 \quad (8)$$

wherein a reference symbol $D_{11}$ represents the airspace between the above described front subunit and rear subunit.

When the above-mentioned condition (8) is satisfied, it is easy to correct lateral chromatic aberration at the low magnification position and spherical aberration at the high magnification position. Furthermore, a principal point of the first lens unit is moved toward the intermediate image, thereby strengthening the negative refractive power of the second lens unit. As a result, the second lens unit has a shortened moving distance, whereby the zoom photographic optical system has a composition preferable for layout of the lens units. Furthermore, it is easy to correct lateral chromatic aberration at the low magnification position and spherical aberration at the high magnification position.

If $D_{11}/D_1$ has a value smaller than a lower limit of 0.3 of the condition (8), the principal point of the first lens unit is moved for a shorter distance, thereby making it impossible to strengthen the negative refractive power of the second lens unit. Accordingly, the second lens unit must be moved for a long distance for the magnification change, thereby enlarging the optical system. If $D_{11}/D_1$ is larger than an upper limit of 0.8 of the condition (8), a distance as measured from the rear subunit of the first lens unit to the intermediate image will be too short. Accordingly, the offaxial principal ray and axial ray will have small heights on the rear subunit of the first lens unit at the low magnification position and the high magnification position respectively. As a result, the first lens unit cannot exhibit effects for correcting aberrations. In addition, the second lens unit is moved for a short distance for the magnification change, thereby making it impossible to obtain a high vari-focal ratio of the optical system.

Figure 2A:
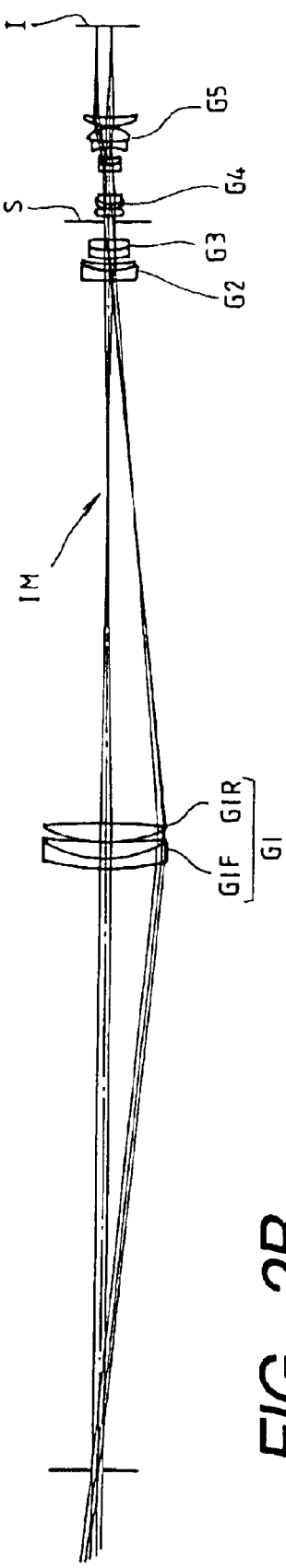
FIG. 2A, FIG. 2B and FIG. 2C are sectional views showing a composition of a second embodiment of the present invention.
Figure 2B:
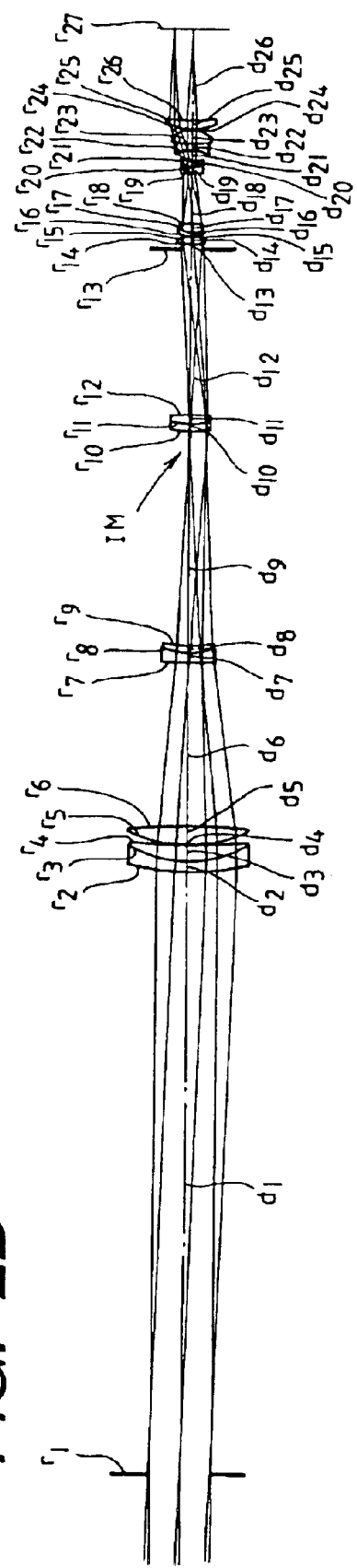
Figure 2C:
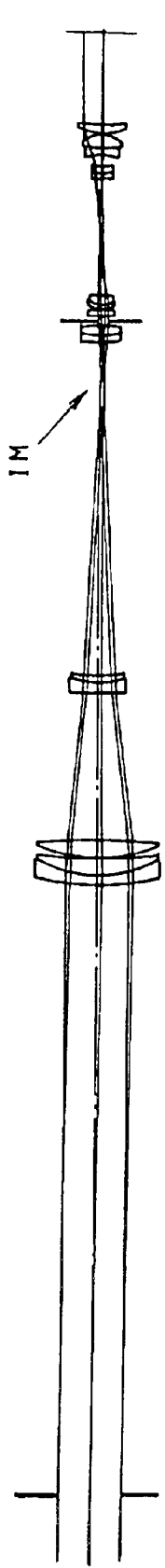
Figure 3A:
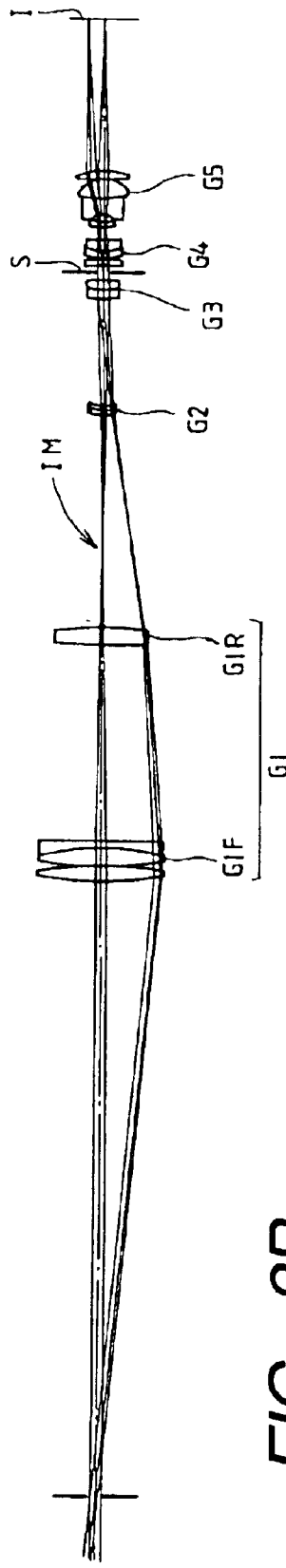
FIG. 3A, FIG. 3B and FIG. 3C are sectional views showing a composition of a third embodiment of the present invention.
Figure 3B:
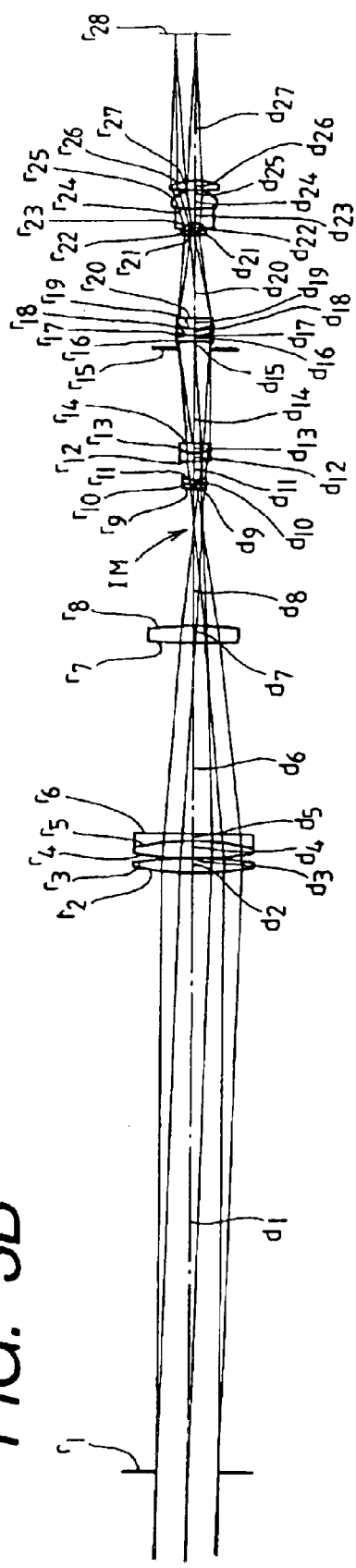
Figure 3C:
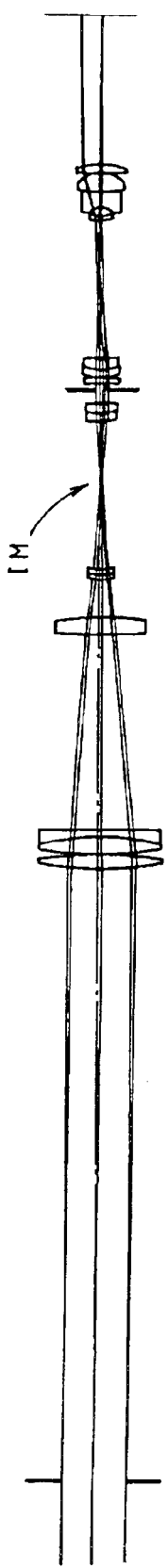
Figure 4A:
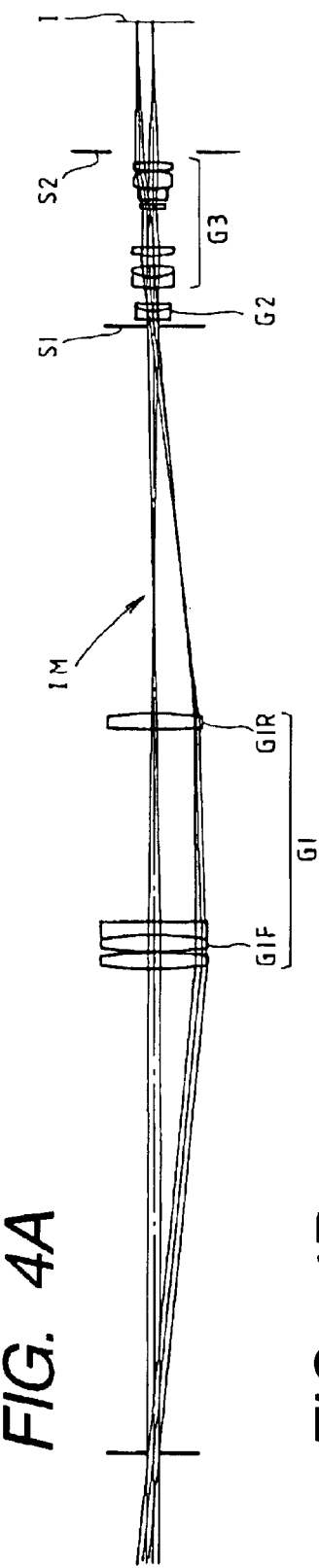
FIG. 4A.
Figure 4B:
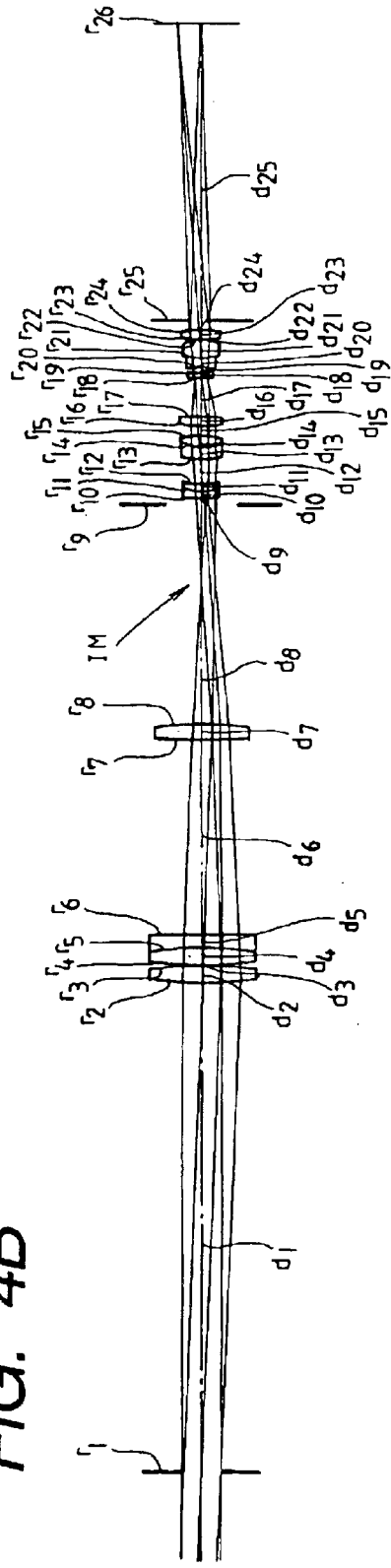
FIG. 4B and FIG. 4C are sectional views showing a composition of a fourth embodiment of the present invention.
Figure 4C:
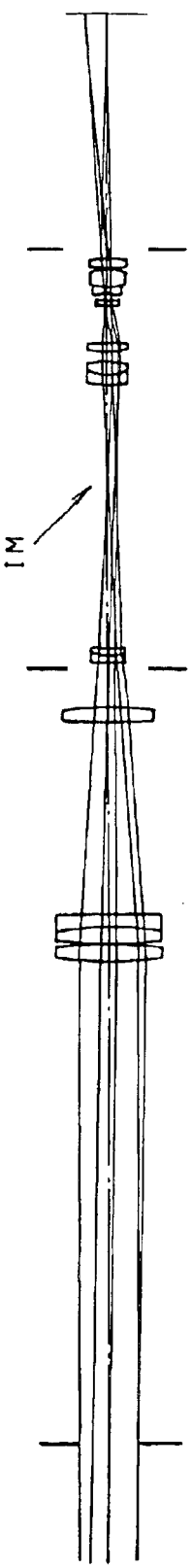
Figure 5A:
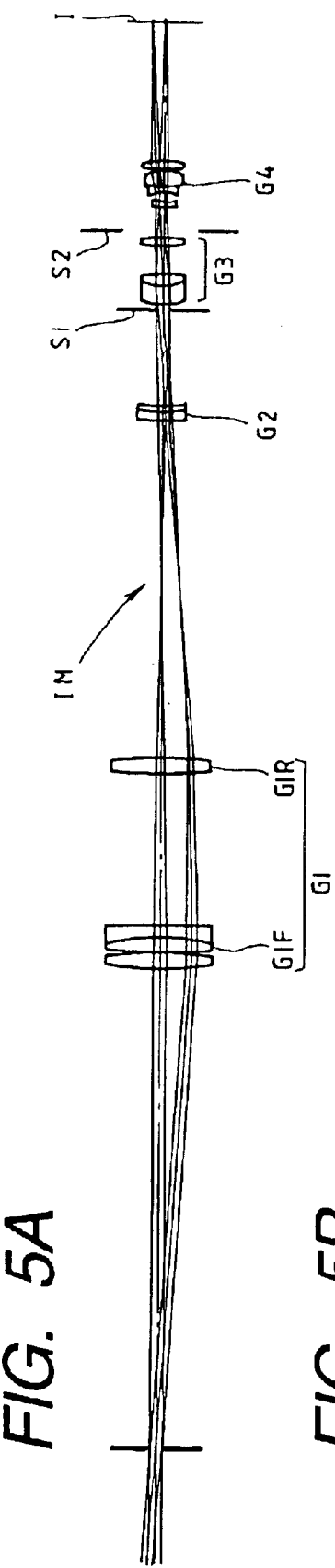
FIG. 5A, FIG. 5B and FIG. 5C are sectional views showing a composition of a fifth embodiment of the present invention.
Figure 5B:
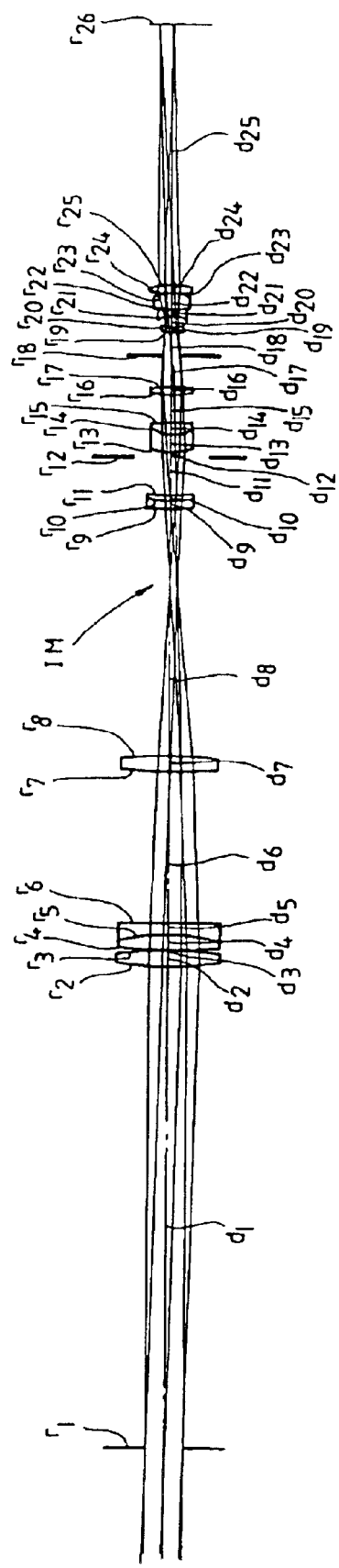
Figure 5C:
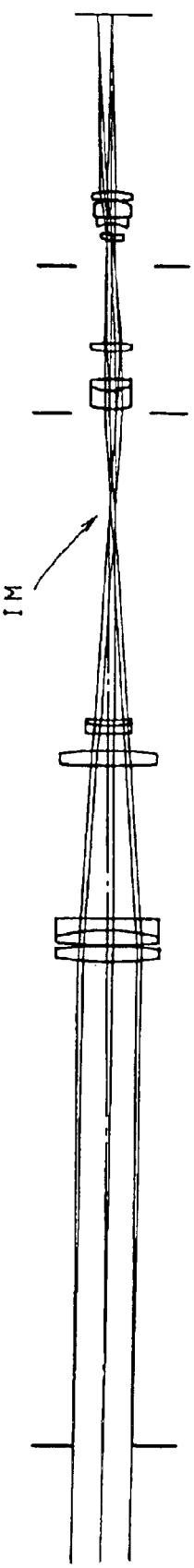

Description will be made below of embodiments of the zoom photographic optical system according to the present invention. First through seventh embodiments of the present invention has compositions illustrated in FIG. 1A, FIG. 1B, FIG. 1C; FIG. 2A, FIG. 2B, FIG. 2C; FIG. 3A, FIG. 3B, FIG. 3C; FIG. 4A, FIG. 4B, FIG. 4C; FIG. 5A, FIG. 5B, FIG. 5C; FIG. 6A, FIG. 6B, FIG. 6C and FIG. 7A, FIG. 7B, FIG. 7C respectively, and numerical data listed below:

Embodiment 1

$r_0 = \infty$ (object position)
$d_0 = \infty$
$r_1 = \infty$
$d_1 = 169$
$r_2 = 67.1869$
$d_2 = 7.547$, $n_1 = 1.48749$, $\nu_1 = 70.23$
$r_3 = -45.9402$
$d_3 = 2.72$, $n_2 = 1.834$, $\nu_2 = 37.16$
$r_4 = -141.2135$
$d_4 = 0.3$
$r_5 = 387.4084$
$d_5 = 4.51$, $n_3 = 1.48749$, $\nu_3 = 70.23$
$r_6 = -97.1714$
$d_6 = a1$ (variable)
$r_7 = 208.2334$
$d_7 = 3.52$, $n_4 = 1.6779$, $\nu_4 = 55.34$
$r_8 = 26.2944$
$d_8 = 2.52$, $n_5 = 1.62004$, $\nu_5 = 36.26$
$r_9 = 57.7801$
$d_9 = a2$ (variable)
$r_{10} = 584.6562$
$d_{10} = 1.4571$, $n_6 = 1.7495$, $\nu_6 = 35.28$
$r_{11} = 92.5746$
$d_{11} = 1.8738$, $n_7 = 1.741$, $\nu_7 = 52.64$
$r_{12} = -38.032$
$d_{12} = a3$ (variable)
$r_{13} = \infty$ (aperture stop)
$d_{13} = 1.5$
$r_{14} = 8.2077$
$d_{14} = 0.826$, $n_8 = 1.834$, $\nu_8 = 37.16$
$r_{15} = 5.3328$
$d_{15} = 2.2337$, $n_9 = 1.497$, $\nu_9 = 81.54$
$r_{16} = 95.6866$
$d_{16} = 0.1$
$r_{17} = 26.168$
$d_{17} = 1.67$, $n_{10} = 1.497$, $\nu_{10} = 81.54$
$r_{18} = -35.0969$
$d_{18} = a4$ (variable)
$r_{19} = -22.1168$
$d_{19} = 1.3365$, $n_{11} = 1.72916$, $\nu_{11} = 54.68$
$r_{20} = 5.2959$
$d_{20} = 1.7985$, $n_{12} = 1.7552$, $\nu_{12} = 27.51$
$r_{21} = 5.2442$
$d_{21} = 1.6793$
$r_{22} = -14.0659$
$d_{22} = 1.663$, $n_{13} = 1.834$, $\nu_{13} = 37.16$
$r_{23} = 9.1381$
$d_{23} = 3.0653$, $n_{14} = 1.51633$, $\nu_{14} = 64.14$
$r_{24} = -19.9171$
$d_{24} = 0.3573$
$r_{25} = 64.6264$
$d_{25} = 4.1578$, $n_{15} = 1.755$, $\nu_{15} = 52.32$
$r_{26} = -9.2262$
$d_{26} = 24.9897$
$r_{27} = \infty$ (image surface)

-continued

| Focal length | Low magnification position 45 mm | Intermediate magnification position 180 mm | High magnification position 900 mm |
|---|---|---|---|
| a1 | 155.234 | 35.584 | 25.868 |
| a2 | 0.737 | 76.891 | 113.022 |
| a3 | 3.741 | 41.950 | 0.978 |
| a4 | 5.455 | 10.746 | 25.311 |

| Focal length | Low magnification position 45 mm | Intermediate magnification position 180 mm | High magnification position 900 mm |
|---|---|---|---|
| Numerical aperture on exit side | 0.032 | 0.0475 | 0.0095 |
| Diameter of aperture stop | 2.74 | open | open |
| Location of exit pupil | −173.5 | −145.7 | −247.9 |
| Image height | 4 | 5.5 | 5.5 |
| Angle of principal ray | −0.76° | −1.92° | −1.16° |

| | |
|---|---|
| FH | 166.95 |
| FL | 86.15 |
| MGH | −5.39 |
| MGL | −0.522 |
| $d_1$ | 96.11 |
| $d_0$ | 235.00 |
| $d_2$ | 129.37 |
| FB | 24.99 |
| $\nu P - \nu N$ | 33.07 |
| Gn | 1.72916 |
| $d_{11}$ | 0.3 |

| Conditions | | |
|---|---|---|
| Condition (1) | FH/FL | 1.94 |
| Condition (2) | MGH/MGL | 10.33 |
| Condition (3) | $d_1/d_0$ | 0.41 |
| Condition (4) | $d_2/d_0$ | 0.55 |
| Condition (5) | FB/$d_0$ | 0.11 |
| Condition (6) | $\nu P - \nu N$ | 33.07 |
| Condition (7) | Gn | 1.72916 |
| Condition (8) | $d_{11}/d_1$ | 0.003 |

Embodiment 2

$r_0 = \infty$ (object position)
$\quad d_0 = \infty$
$r_1 = \infty$
$\quad d_1 = 171$
$r_2 = 66.6272$
$\quad d_2 = 3 \quad n_1 = 1.834 \quad \nu_1 = 37.16$
$r_3 = 32.7099$
$\quad d_3 = 4.7856 \quad n_2 = 1.48749 \quad \nu_2 = 70.23$
$r_4 = 144.8633$
$\quad d_4 = 0.3$
$r_5 = 43.4766$
$\quad d_5 = 4.9224 \quad n_3 = 1.48749 \quad \nu_3 = 70.23$
$r_6 = -247.7255$
$\quad d_6 = a1$ (variable)
$r_7 = 224.5351$
$\quad d_7 = 2.8629 \quad n_4 = 1.6779 \quad \nu_4 = 55.34$
$r_8 = 19.6414$
$\quad d_8 = 1.9606 \quad n_5 = 1.64769 \quad \nu_5 = 33.79$
$r_9 = 41.213$
$\quad d_9 = a2$ (variable)
$r_{10} = 32.0373$
$\quad d_{10} = 2.2168 \quad n_6 = 1.68893 \quad \nu_6 = 31.07$
$r_{11} = 23.0472$
$\quad d_{11} = 2.7845 \quad n_7 = 1.497 \quad \nu_7 = 81.54$
$r_{12} = -56.8075$
$\quad d_{12} = a3$ (variable)
$r_{13} = \infty$ (aperture stop)
$\quad d_{13} = 1.5$ -continued $r_{14} = 58.8783$
$\quad d_{14} = 1.937 \quad n_8 = 1.48749 \quad \nu_8 = 70.23$
$r_{15} = -723.778$
$\quad d_{15} = 0.1$
$r_{16} = 8.5331$
$\quad d_{16} = 1.0819 \quad n_9 = 1.834 \quad \nu_9 = 37.16$
$r_{17} = 5.6682$
$\quad d_{17} = 2.5777 \quad n_{10} = 1.497 \quad \nu_{10} = 81.54$
$r_{18} = -68.5936$
$\quad d_{18} = a4$ (variable)
$r_{19} = -25.0547$
$\quad d_{19} = 1.8 \quad n_{11} = 1.79952 \quad \nu_{11} = 42.22$
$r_{20} = 4.4807$
$\quad d_{20} = 2 \quad n_{12} = 1.755 \quad \nu_{12} = 52.32$
$r_{21} = 7.9235$
$\quad d_{21} = 2.4631$
$r_{22} = -11.5664$
$\quad d_{22} = 2 \quad n_{13} = 1.755 \quad \nu_{13} = 52.32$
$r_{23} = 37.7158$
$\quad d_{23} = 3.8464 \quad n_{14} = 1.48749 \quad \nu_{14} = 70.23$
$r_{24} = -7.5353$
$\quad d_{24} = 0.4986$
$r_{25} = 14.991$
$\quad d_{25} = 2.62 \quad n_{15} = 1.788 \quad \nu_{15} = 47.37$
$r_{26} = 83.5118$
$\quad d_{26} = 24.9988$
$r_{27} = \infty$ (image surface)

| Focal length | Low magnification position 45 mm | Intermediate magnification position 180 mm | High magnification position 900 mm |
|---|---|---|---|
| a1 | 151.643 | 46.200 | 40.821 |
| a2 | 1.500 | 59.788 | 91.280 |
| a3 | 5.057 | 45.224 | 1.008 |
| a4 | 6.544 | 13.532 | 31.636 |

| Focal length | Low magnification position 45 mm | Intermediate magnification position 180 mm | High magnification position 900 mm |
|---|---|---|---|
| Numerical aperture on exit side | 0.032 | 0.0475 | 0.0095 |
| Diameter of aperture stop | 1.7990 | open | open |
| Location of exit pupil | −137.7 | −195.9 | −179.1 |
| Image height | 4 | 5.5 | 5.5 |
| Angle of principal ray | −1.21° | −1.24° | −1.35° |

| | |
|---|---|
| FH | 178.23 |
| FL | 86.00 |
| MGH | −5.05 |
| MGL | −0.523 |
| $d_1$ | 93.897 |
| $d_0$ | 235 |
| $d_2$ | 110.823 |
| FB | 24.9988 |
| $\nu P - \nu N$ | 33.07 |
| Gn | 1.79952 |
| $d_{11}$ | 0.3 |

| Conditions | | |
|---|---|---|
| Condition (1) | FH/FL | 2.07 |
| Condition (2) | MGH/MGL | 9.66 |
| Condition (3) | d1/d0 | 0.40 |
| Condition (4) | d2/d0 | 0.47 |
| Condition (5) | FB/d0 | 0.11 |
| Condition (6) | $\nu P - \nu N$ | 33.07 |
| Condition (7) | Gn | 1.79952 |
| Condition (8) | d11/d1 | 0.003 |

-continued

Embodiment 3

| | | | |
|---|---|---|---|
| $r_0 = \infty$ (object position) | | | |
| | $d_0 = \infty$ | | |
| $r_1 = \infty$ | | | |
| | $d_1 = 171$ | | |
| $r_2 = 83.7637$ | | | |
| | $d_2 = 4.2251$ | $n_1 = 1.48749$ | $\nu_1 = 70.23$ |
| $r_3 = -122.3144$ | | | |
| | $d_3 = 0.11$ | | |
| $r_4 = 119.605$ | | | |
| | $d_4 = 4.8276$ | $n_2 = 1.497$ | $\nu_2 = 81.54$ |
| $r_5 = -66.7389$ | | | |
| | $d_5 = 2$ | $n_3 = 1.834$ | $\nu_3 = 37.16$ |
| $r_6 = -872.6535$ | | | |
| | $d_6 = 54.2925$ | | |
| $r_7 = 290.0087$ | | | |
| | $d_7 = 4.5274$ | $n_4 = 1.48749$ | $\nu_4 = 70.23$ |
| $r_8 = -89.6797$ | | | |
| | $d_8 = a1$ (variable) | | |
| $r_9 = 36.2112$ | | | |
| | $d_9 = 0.8953$ | $n_5 = 1.72916$ | $\nu_5 = 54.68$ |
| $r_{10} = 10.115$ | | | |
| | $d_{10} = 1.4238$ | $n_6 = 1.76182$ | $\nu_6 = 26.52$ |
| $r_{11} = 14.5283$ | | | |
| | $d_{11} = a2$ (variable) | | |
| $r_{12} = 21.4153$ | | | |
| | $d_{12} = 2.3322$ | $n_7 = 1.7495$ | $\nu_7 = 35.28$ |
| $r_{13} = 11.7863$ | | | |
| | $d_{13} = 2.9693$ | $n_8 = 1.48749$ | $\nu_8 = 70.23$ |
| $r_{14} = -23.1627$ | | | |
| | $d_{14} = a3$ (variable) | | |
| $r_{15} = \infty$ (aperture stop) | | | |
| | $d_{15} = 1.5$ | | |
| $r_{16} = -104.5021$ | | | |
| | $d_{16} = 1.872$ | $n_9 = 1.6779$ | $\nu_9 = 55.34$ |
| $r_{17} = -27.2425$ | | | |
| | $d_{17} = 0.1$ | | |
| $r_{18} = 17.9714$ | | | |
| | $d_{18} = 2$ | $n_{10} = 1.76182$ | $\nu_{10} = 26.52$ |
| $r_{19} = 10.8489$ | | | |
| | $d_{19} = 3$ | $n_{11} = 1.497$ | $\nu_{11} = 81.54$ |
| $r_{20} = -79.1553$ | | | |
| | $d_{20} = a4$ (variable) | | |
| $r_{21} = 489.6959$ | | | |
| | $d_{21} = 1.1989$ | $n_{12} = 1.755$ | $\nu_{12} = 52.32$ |
| $r_{22} = 11.0202$ | | | |
| | $d_{22} = 1.8964$ | | |
| $r_{23} = -5.1555$ | | | |
| | $d_{23} = 4.359$ | $n_{13} = 1.755$ | $\nu_{13} = 52.32$ |
| $r_{24} = 28.5111$ | | | |
| | $d_{24} = 5.1668$ | $n_{14} = 1.48749$ | $\nu_{14} = 70.23$ |
| $r_{25} = -7.7846$ | | | |
| | $d_{25} = 0.1$ | | |
| $r_{26} = -1.04 \times 10^4$ | | | |
| | $d_{26} = 2.1066$ | $n_{15} = 1.755$ | $\nu_{15} = 52.32$ |
| $r_{27} = -22.2202$ | | | |
| | $d_{27} = 41.1071$ | | |
| $r_{28} = \infty$ (image surface) | | | |

| | Low magnification position | Intermediate magnification position | High magnification position |
|---|---|---|---|
| Focal length | 45 mm | 180 mm | 900 mm |
| a1 | 57.957 | 38.572 | 11.012 |
| a2 | 28.819 | 5.002 | 40.222 |
| a3 | 2.419 | 26.379 | 3.678 |
| a4 | 3.797 | 23.040 | 38.079 |

| | Low magnification position | Intermediate magnification position | High magnification position |
|---|---|---|---|
| Focal length | 45 mm | 180 mm | 900 mm |
| Numerical aperture on exit side | 0.032 | 0.0475 | 0.0095 |
| Diameter of aperture stop | 2.7 | open | open |
| Location of exit pupil | −162.5 | −360.1 | −376.7 |
| Image height | 4 | 5.5 | 5.5 |
| Angle of principal ray | −0.84° | −1.17° | −1.14° |

| | |
|---|---|
| FH | 134.33 |
| FL | 79.70 |
| MGH | −6.70 |
| MGL | −0.57 |
| $d_1$ | 98.21 |
| $d_0$ | 235.00 |
| $d_2$ | 46.95 |
| FB | 41.11 |
| $\nu P - \nu N$ | 44.38 |
| Gn | 1.755 |
| $d_{11}$ | 54.2925 |

Conditions

| | | |
|---|---|---|
| Condition (1) | FH/FL | 1.69 |
| Condition (2) | MGH/MGL | 11.86 |
| Condition (3) | $d_1/d_0$ | 0.42 |
| Condition (4) | $d_2/d_0$ | 0.20 |
| Condition (5) | $FB/d_0$ | 0.17 |
| Condition (6) | $\nu P - \nu N$ | 44.38 |
| Condition (7) | Gn | 1.755 |
| Condition (8) | $d_{11}/d_1$ | 0.553 |

Embodiment 4

| | | | |
|---|---|---|---|
| $r_0 = \infty$ (object position) | | | |
| | $d_0 = \infty$ | | |
| $r_1 = \infty$ | | | |
| | $d_1 = 121$ | | |
| $r_2 = 79.1185$ | | | |
| | $d_2 = 4.36$ | $n_1 = 1.48749$ | $\nu_1 = 70.23$ |
| $r_3 = -129.1452$ | | | |
| | $d_3 = 0.34$ | | |
| $r_4 = 134.8925$ | | | |
| | $d_4 = 4.2$ | $n_2 = 1.497$ | $\nu_2 = 81.54$ |
| $r_5 = -64.5941$ | | | |
| | $d_5 = 3.2$ | $n_3 = 1.834$ | $\nu_3 = 37.16$ |
| $r_6 = -1018.704$ | | | |
| | $d_6 = 47.545$ | | |
| $r_7 = 233.2438$ | | | |
| | $d_7 = 4.1$ | $n_4 = 1.48749$ | $\nu_4 = 70.23$ |
| $r_8 = -73.1117$ | | | |
| | $d_8 = a1$ (variable) | | |
| $r_9 = \infty$ (aperture stop) | | | |
| | $d_9 = 1$ | | |
| $r_{10} = 2190.8495$ | | | |
| | $d_{10} = 2.17$ | $n_5 = 1.755$ | $\nu_5 = 52.32$ |
| $r_{11} = 15.5321$ | | | |
| | $d_{11} = 1.5$ | $n_6 = 1.7847$ | $\nu_6 = 26.29$ |
| $r_{12} = 30.5669$ | | | |
| | $d_{12} = a2$ (variable) | | |
| $r_{13} = 23.3958$ | | | |
| | $d_{13} = 3.1$ | $n_7 = 1.76182$ | $\nu_7 = 26.52$ |
| $r_{14} = 12.1402$ | | | |
| | $d_{14} = 2.7$ | $n_8 = 1.497$ | $\nu_8 = 81.54$ |
| $r_{15} = -44.9651$ | | | |
| | $d_{15} = 2.1639$ | | |
| $r_{16} = 15.6099$ | | | |
| | $d_{16} = 2.3703$ | $n_9 = 1.6779$ | $\nu_9 = 55.34$ |
| $r_{17} = -90.4022$ | | | |
| | $d_{17} = 9.4325$ | | |
| $r_{18} = 202.7558$ | | | |
| | $d_{18} = 1.2$ | $n_{10} = 1.755$ | $\nu_{10} = 52.32$ |
| $r_{19} = 18.2864$ | | | |
| | $d_{19} = 1.3265$ | | |
| $r_{20} = -6.5567$ | | | |
| | $d_{20} = 2.2446$ | $n_{11} = 1.8061$ | $\nu_{11} = 40.92$ |
| $r_{21} = 18.3072$ | | | |
| | $d_{21} = 4.762$ | $n_{12} = 1.6516$ | $\nu_{12} = 58.55$ |
| $r_{22} = -1.09 \times 10^1$ | | | |
| | $d_{22} = 0.1$ | | |

-continued

| | | | |
|---|---|---|---|
| $r_{23} = -2.09 \times 10^4$ | | | |
| | $d_{23} = 2.0811$ | $n_{13} = 1.755$ | $v_{13} = 52.32$ |
| $r_{24} = -2.00 \times 10^1$ | | | |
| | $d_{24} = 2$ | | |
| $r_{25} = \infty$ (aperture stop) | | | |
| | $d_{25} = a3$ (variable) | | |
| $r_{26} = \infty$ (image surface) | | | |

| Focal length | Low magnification position 45 mm | Intermediate magnification position 180 mm | High magnification position 900 mm |
|---|---|---|---|
| a1 | 96.002 | 53.833 | 9.584 |
| a2 | 3.887 | 5.780 | 64.922 |
| a3 | 33.215 | 73.491 | 58.598 |

| Focal length | Low magnification position 45 mm | Intermediate magnification position 180 mm | High magnification position 900 mm |
|---|---|---|---|
| Numerical aperture on exit side | 0.03 | 0.03 | 0.02 |
| S1 diameter of aperture stop | 2.24 | open | open |
| S2 diameter of aperture stop | open | 4.41 | open |
| Location of exit pupil | −125.6 | −82.1 | −62.0 |
| Image height | 4 | 5.5 | 5.5 |
| Angle of principal ray | −1.35° | −2.78° | −3.67° |

| | | |
|---|---|---|
| | FH | 148.44 |
| | FL | 74.85 |
| | MGH | −2.43 |
| | MGL | −0.60 |
| | $d_1$ | 97.73 |
| | $d_0$ | 235.00 |
| | $d_2$ | 86.42 |
| | FB | 35.21 |
| | $vP-vN$ | 44.38 |
| | Gn | 1.8061 |
| | $d_{11}$ | 47.55 |

| Conditions | | |
|---|---|---|
| Condition (1) | FH/FL | 1.98 |
| Condition (2) | MGH/MGL | 4.03 |
| Condition (3) | $d_1/d_0$ | 0.42 |
| Condition (4) | $d_2/d_0$ | 0.37 |
| Condition (5) | $FB/d_0$ | 0.15 |
| Condition (6) | $vP-vN$ | 44.38 |
| Condition (7) | Gn | 1.8061 |
| Condition (8) | $d_{11}/d_1$ | 0.486 |

Embodiment 5

| | | | |
|---|---|---|---|
| $r_0 = \infty$ (object position) | | | |
| | $d_0 = \infty$ | | |
| $r_1 = \infty$ | | | |
| | $d_1 = 121$ | | |
| $r_2 = 65.4479$ | | | |
| | $d_2 = 4.36$ | $n_1 = 1.48749$ | $v_1 = 70.23$ |
| $r_3 = -107.6643$ | | | |
| | $d_3 = 0.34$ | | |
| $r_4 = 188.4021$ | | | |
| | $d_4 = 3.572$ | $n_2 = 1.497$ | $v_2 = 81.54$ |
| $r_5 = -51.8179$ | | | |
| | $d_5 = 2.9997$ | $n_3 = 1.834$ | $v_3 = 37.16$ |
| $r_6 = -1777.6225$ | | | |
| | $d_6 = 37.8461$ | | |
| $r_7 = 134.0885$ | | | |
| | $d_7 = 4.1$ | $n_4 = 1.48749$ | $v_4 = 70.23$ |
| $r_8 = -97.8666$ | | | |
| | $d_8 = a1$ (variable) | | |
| $r_9 = 90.024$ | | | |

-continued

| | | | |
|---|---|---|---|
| | $d_9 = 2$ | $n_5 = 1.755$ | $v_5 = 52.32$ |
| $r_{10} = 21.3734$ | | | |
| | $d_{10} = 1.5$ | $n_6 = 1.7847$ | $v_6 = 26.29$ |
| $r_{11} = 37.7178$ | | | |
| | $d_{11} = a2$ (variable) | | |
| $r_{12} = \infty$ (aperture stop) | | | |
| | $d_{12} = 1$ | | |
| $r_{13} = 17.1901$ | | | |
| | $d_{13} = 4.5101$ | $n_7 = 1.76182$ | $v_7 = 26.52$ |
| $r_{14} = 8.9873$ | | | |
| | $d_{14} = 2.856$ | $n_8 = 1.497$ | $v_8 = 81.54$ |
| $r_{15} = -81.2442$ | | | |
| | $d_{15} = 6.7864$ | | |
| $r_{16} = 23.5931$ | | | |
| | $d_{16} = 2.1$ | $n_9 = 1.741$ | $v_9 = 52.64$ |
| $r_{17} = -71.7369$ | | | |
| | $d_{17} = a3$ (variable) | | |
| $r_{18} = \infty$ (aperture stop) | | | |
| | $d_{18} = 6$ | | |
| $r_{19} = 38.6343$ | | | |
| | $d_{19} = 1.2$ | $n_{10} = 1.755$ | $v_{10} = 52.32$ |
| $r_{20} = 8.5656$ | | | |
| | $d_{20} = 2.3709$ | | |
| $r_{21} = 7.1479$ | | | |
| | $d_{21} = 1.8251$ | $n_{11} = 1.7859$ | $v_{11} = 44.2$ |
| $r_{22} = 47.4848$ | | | |
| | $d_{22} = 3.8636$ | $n_{12} = 1.6516$ | $v_{12} = 58.55$ |
| $r_{23} = -12.5359$ | | | |
| | $d_{23} = 0.1$ | | |
| $r_{24} = 58.1544$ | | | |
| | $d_{24} = 2.2154$ | $n_{13} = 1.755$ | $v_{13} = 52.32$ |
| $r_{25} = -19.3344$ | | | |
| | $d_{25} = a4$ (variable) | | |
| $r_{26} = \infty$ (image surface) | | | |

| Focal length | Low magnification position 45 mm | Intermediate magnification position 180 mm | High magnification position 900 mm |
|---|---|---|---|
| a1 | 83.563 | 61.402 | 4.112 |
| a2 | 24.024 | 9.531 | 75.690 |
| a3 | 1.475 | 7.929 | 19.645 |
| a4 | 34.393 | 64.593 | 44.008 |

| Focal length | Low magnification position 45 mm | Intermediate magnification position 180 mm | High magnification position 900 mm |
|---|---|---|---|
| Numerical aperture on exit side | 0.032 | 0.032 | 0.02 |
| S1 diameter of aperture stop | 3.22 | open | open |
| S2 diameter of aperture stop | open | 3.72 | open |
| Location of exit pupil | −100.0 | −100.1 | −99.9 |
| Image height | 4 | 5.5 | 5.5 |
| Angle of principal ray | −1.47° | −2.19° | −2.2° |

| | | |
|---|---|---|
| | FH | 112.77 |
| | FL | 72.78 |
| | MGH | −3.19 |
| | MGL | −0.62 |
| | $d_1$ | 94.26 |
| | $d_0$ | 235.00 |
| | $d_2$ | 79.45 |
| | FB | 34.39 |
| | $vP-vN$ | 44.38 |
| | Gn | 1.755 |
| | $d_{11}$ | 37.8461 |

| Conditions | | |
|---|---|---|
| Condition (1) | FH/FL | 1.55 |
| Condition (2) | MGH/MGL | 5.17 |

-continued

| | | |
|---|---|---|
| Condition (3) | $d_1/d_0$ | 0.40 |
| Condition (4) | $d_2/d_0$ | 0.34 |
| Condition (5) | $FB/d_0$ | 0.15 |
| Condition (6) | $\nu P - \nu N$ | 44.38 |
| Condition (7) | Gn | 1.755 |
| Condition (8) | $d_{11}/d_1$ | 0.401 |

Embodiment 6

$r_0 = \infty$ (object position)
$d_0 = \infty$
$r_1 = \infty$
$d_1 = 121$
$r_2 = 86.4522$
$d_2 = 4.36$, $n_1 = 1.48749$, $\nu_1 = 70.23$
$r_3 = -104.53$
$d_3 = 0.34$
$r_4 = 152.9995$
$d_4 = 3.9661$, $n_2 = 1.497$, $\nu_2 = 81.54$
$r_5 = -62.2291$
$d_5 = 2.9996$, $n_3 = 1.834$, $\nu_3 = 37.16$
$r_6 = -1231.9922$
$d_6 = 50.1501$
$r_7 = 78.5162$
$d_7 = 4.1$, $n_4 = 1.48749$, $\nu_4 = 70.23$
$r_8 = -147.3165$
$d_8 = a1$ (variable)
$r_9 = 162.9484$
$d_9 = 2$, $n_5 = 1.755$, $\nu_5 = 52.32$
$r_{10} = 17.845$
$d_{10} = 1.5$, $n_6 = 1.7847$, $\nu_6 = 26.29$
$r_{11} = 33.4446$
$d_{11} = a2$ (variable)
$r_{12} = \infty$ (aperture stop)
$d_{12} = 1$
$r_{13} = 16.2349$
$d_{13} = 4.5112$, $n_7 = 1.76182$, $\nu_7 = 26.52$
$r_{14} = 8.6452$
$d_{14} = 2.7573$, $n_8 = 1.497$, $\nu_8 = 81.54$
$r_{15} = -70.5196$
$d_{15} = 2.6559$
$r_{16} = 29.9158$
$d_{16} = 1.9672$, $n_9 = 1.741$, $\nu_9 = 52.64$
$r_{17} = -59.0331$
$d_{17} = a3$ (variable)
$r_{18} = \infty$ (aperture stop)
$d_{18} = 6$
$r_{19} = 24.2288$
$d_{19} = 1.2$, $n_{10} = 1.755$, $\nu_{10} = 52.32$
$r_{20} = 9.0169$
$d_{20} = 5.3871$
$r_{21} = -8.1925$
$d_{21} = 1.4989$, $n_{11} = 1.8061$, $\nu_{11} = 40.92$
$r_{22} = 19.6718$
$d_{22} = 3.968$, $n_{12} = 1.6779$, $\nu_{12} = 55.34$
$r_{23} = -13.4586$
$d_{23} = 0.1$
$r_{24} = 64.0287$
$d_{24} = 2.6335$, $n_{13} = 1.755$, $\nu_{13} = 52.32$
$r_{25} = -17.5014$
$d_{25} = a4$ (variable)
$r_{26} = \infty$ (image surface)

| Focal length | Low magnification position 45 mm | Intermediate magnification position 180 mm | High magnification position 900 mm |
|---|---|---|---|
| a1 | 83.259 | 49.445 | 1.996 |
| a2 | 8.032 | 7.404 | 82.045 |
| a3 | 0.782 | 15.407 | 20.761 |
| a4 | 39.831 | 59.650 | 27.103 |

-continued

| Focal length | Low magnification position 45 mm | Intermediate magnification position 180 mm | High magnification position 900 mm |
|---|---|---|---|
| Numerical aperture on exit side | 0.032 | 0.032 | 0.02 |
| S1 diameter of aperture stop | 2.56 | open | open |
| S2 diameter of aperture stop | open | 2.86 | open |
| Location of exit pupil | −180.0 | −179.9 | −180.0 |
| Image height | 4 | 5.5 | 5.5 |
| Angle of principal ray | −0.91° | −1.65° | −1.55° |

| | | |
|---|---|---|
| FH | | 146.16 |
| FL | | 74.54 |
| MGH | | −2.46 |
| MGL | | −0.60 |
| $d_1$ | | 99.49 |
| $d_0$ | | 235.00 |
| $d_2$ | | 81.26 |
| FB | | 39.83 |
| $\nu P - \nu N$ | | 44.38 |
| Gn | | 1.8061 |
| $d_{11}$ | | 50.1501 |

Conditions

| | | |
|---|---|---|
| Condition (1) | FH/FL | 1.96 |
| Condition (2) | MGH/MGL | 4.10 |
| Condition (3) | $d_1/d_0$ | 0.42 |
| Condition (4) | $d_2/d_0$ | 0.35 |
| Condition (5) | $FB/d_0$ | 0.17 |
| Condition (6) | $\nu P - \nu N$ | 44.38 |
| Condition (7) | Gn | 1.8061 |
| Condition (8) | $d_{11}/d_1$ | 0.504 |

Embodiment 7

$r_0 = \infty$ (object position)
$d_0 = \infty$
$r_1 = \infty$
$d_1 = 171$
$r_2 = 106.0143$
$d_2 = 4.0678$, $n_1 = 1.48749$, $\nu_1 = 70.23$
$r_3 = -105.4374$
$d_3 = 0.11$
$r_4 = 94.8357$
$d_4 = 5.033$, $n_2 = 1.497$, $\nu_2 = 81.54$
$r_5 = -65.2476$
$d_5 = 2$, $n_3 = 1.834$, $\nu_3 = 37.16$
$r_6 = -1384.1281$
$d_6 = 44.6032$
$r_7 = 330.8979$
$d_7 = 4.2853$, $n_4 = 1.48749$, $\nu_4 = 70.23$
$r_8 = -85.0918$
$d_8 = a1$ (variable)
$r_9 = 35.8219$
$d_9 = 1.4929$, $n_5 = 1.72916$, $\nu_5 = 54.68$
$r_{10} = 9.9369$
$d_{10} = 1.4888$, $n_6 = 1.76182$, $\nu_6 = 26.52$
$r_{11} = 13.4216$
$d_{11} = a2$ (variable)
$r_{12} = 26.1077$
$d_{12} = 1.9772$, $n_7 = 1.7495$, $\nu_7 = 35.28$
$r_{13} = 13.1333$
$d_{13} = 3.0409$, $n_8 = 1.48749$, $\nu_8 = 70.23$
$r_{14} = -21.8061$
$d_{14} = a3$ (variable)
$r_{15} = \infty$ (aperture stop)
$d_{15} = 1.5$
$r_{16} = -2.53 \times 10^4$
$d_{16} = 3.2588$, $n_9 = 1.6779$, $\nu_9 = 55.34$
$r_{17} = -29.7574$
$d_{17} = 0.1$ -continued

| | | | |
|---|---|---|---|
| $r_{18} = 16.783$ | | | |
| | $d_{18} = 2.9961$ | $n_{10} = 1.76182$ | $v_{10} = 26.52$ |
| $r_{19} = 9.934$ | | | |
| | $d_{19} = 2.998$ | $n_{11} = 1.497$ | $v_{11} = 81.54$ |
| $r_{20} = -336.8033$ | | | |
| | $d_{20} = a4$ (variable) | | |
| $r_{21} = -22.0556$ | | | |
| | $d_{21} = 1.1986$ | $n_{12} = 1.755$ | $v_{12} = 52.32$ |
| $r_{22} = 14.4164$ | | | |
| | $d_{22} = 1.7324$ | | |
| $r_{23} = -6.6079$ | | | |
| | $d_{23} = 6.0423$ | $n_{13} = 1.755$ | $v_{13} = 52.32$ |
| $r_{24} = 33.4647$ | | | |
| | $d_{24} = 4.8811$ | $n_{14} = 1.48749$ | $v_{14} = 70.23$ |
| $r_{25} = -9.0389$ | | | |
| | $d_{25} = 0.1$ | | |
| $r_{26} = -8062.4705$ | | | |
| | $d_{26} = 2.2234$ | $n_{15} = 1.755$ | $v_1 = 52.32$ |
| $r_{27} = -25.5181$ | | | |
| | $d_{27} = 40.9587$ | | |
| $r_{28} = \infty$ (image surface) | | | |

| Focal length | Low magnification position 45 mm | Intermediate magnification position 180 mm | High magnification position 900 mm |
|---|---|---|---|
| a1 | 57.949 | 41.577 | 15.054 |
| a2 | 36.675 | 4.993 | 45.960 |
| a3 | 0.492 | 30.880 | 7.667 |
| a4 | 3.795 | 21.462 | 30.231 |

| Focal length | Low magnification position 45 mm | Intermediate magnification position 180 mm | High magnification position 900 mm |
|---|---|---|---|
| Numerical aperture on exit side | 0.032 | 0.027 | 0.0095 |
| Diameter of aperture stop | 1.79 | 5.03 | open |
| Location of exit pupil | −180.0 | −179.9 | −180.0 |
| Image height | 4 | 5.5 | 5.5 |
| Angle of principal ray | −0.91° | −1.65° | −1.55° |

| | |
|---|---|
| FH | 145.56 |
| FL | 75.05 |
| MGH | −6.18 |
| MGL | −0.60 |
| $d_1$ | 93.78 |
| $d_0$ | 235.00 |
| $d_2$ | 42.90 |
| FB | 39.83 |
| vP−vN | 44.38 |
| Gn | 1.755 |
| $d_{11}$ | 44.603 |

| Conditions | | |
|---|---|---|
| Condition (1) | FH/FL | 1.94 |
| Condition (2) | MGH/MGL | 10.30 |
| Condition (3) | $d_1/d_0$ | 0.40 |
| Condition (4) | $d_2/d_0$ | 0.18 |
| Condition (5) | FB/$d_0$ | 0.17 |
| Condition (6) | vP−vN | 44.38 |
| Condition (7) | Gn | 1.755 |
| Condition (8) | $d_{11}/d_1$ | 0.476 |

In the numerical data listed above, reference symbols $r_0$, $r_1$, $r_2$, . . . represent radii of curvature on surfaces of the zoom photographic optical system in order from the side of the objective lens system, reference symbols $d_0$, $d_1$, $d_2$, . . . designate airspaces among the surfaces, reference symbols $n_1$, $n_2$, . . . denote refractive indices of respective lens elements for the d-line, and reference symbols $v_1$, $v_2$, . . . represent Abbe's numbers of the respective lens elements. Furthermore, reference symbols a1, a2, a3 and a4 in the numerical data designate airspaces variable for a magnification change. These airspaces are specified at focal lengths of 45 mm, 180 mm and 900 mm in the first, second, third and seventh embodiments. In the fourth, fifth and sixth embodiments, the variable airspaces are specified at focal lengths of 45 mm, 144 mm and 360 mm. Lengths such as the radii of curvature, airspaces, focal lengths, diameters of aperture stops, locations of exit pupils and image heights are specified in a unit of millimeter. Furthermore, locations of the exit pupils are specified as distances (mm) as measured from final surfaces.

The first embodiment is illustrated in FIG. 1, in which a zoom photographic optical system consists, in order from a rear side of an objective lens system, of a first lens unit G1 having positive refractive power, a second lens unit G2 having negative refractive power, a third lens unit G3 having positive refractive power, a fourth lens unit G4 having positive refractive power and a fifth lens unit G5 having positive refractive power. For changing a magnification from a low magnification position to a high magnification position, the second lens unit G2, the third lens unit G3 and the fourth lens unit G4 are moved along an optical axis. When these lens units are moved, the airspace between the first lens unit G1 and the second lens unit G2 is narrowed, the airspace between the second lens unit G2 and the third lens unit G3 is widened, the airspace between the third lens unit G3 and the fourth unit lens unit G4 is first widened and then narrowed, and the airspace between the fourth lens unit G4 and the fifth lens unit G5 is widened.

In the first embodiment, the first lens unit G1 consists of a front subunit G1F which is a positive cemented lens component consisting of a convex lens element and a concave lens element, and a rear subunit G1R which is a convex lens component. The second lens unit G2 consists of a negative cemented meniscus lens component which consists of a negative meniscus lens element and a positive meniscus lens element. The third lens unit G3 consists of a positive cemented lens component which consists of a negative meniscus lens element and a positive meniscus lens element. The fourth lens unit G4 consists of a positive cemented meniscus lens component which consists of a negative meniscus lens element and a positive meniscus lens element, and a convex lens component. The fifth lens unit G5 consists of a negative cemented lens component which consists of a biconcave lens element and a positive meniscus lens element, a negative cemented meniscus lens component which consists of a biconcave lens element and a biconvex lens element, and a convex lens component.

In the zoom photographic optical system according to the first embodiment, a location which is conjugate with a pupil of the objective lens system is situated between the third lens unit G3 and the fourth lens unit G4. An aperture stop S is disposed in the vicinity of the location which is conjugate with the pupil. Furthermore, the aperture stop S is moved together with the fourth lens unit G4 for the magnification change.

Figure 1B:
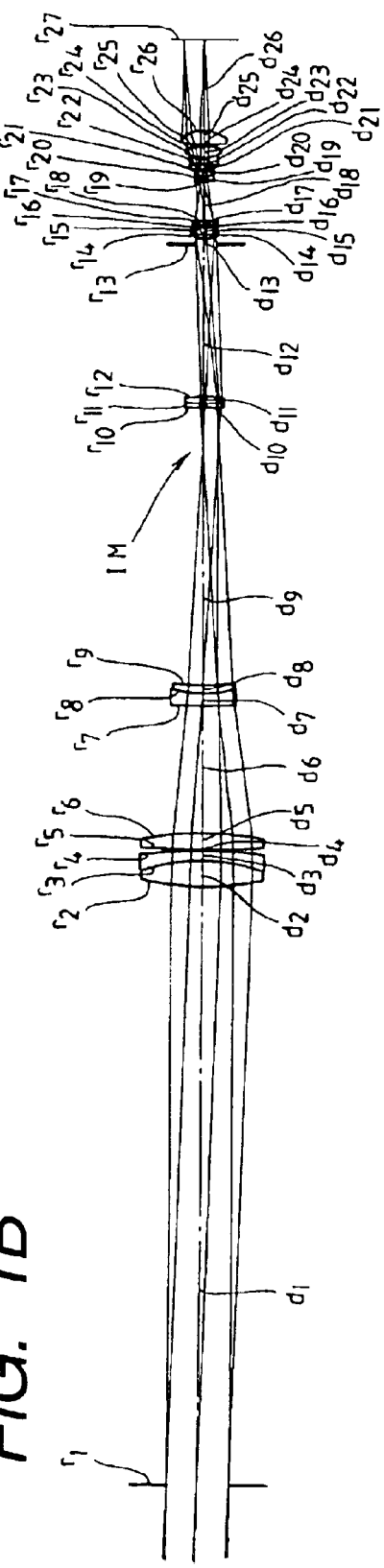
Figure 1C:
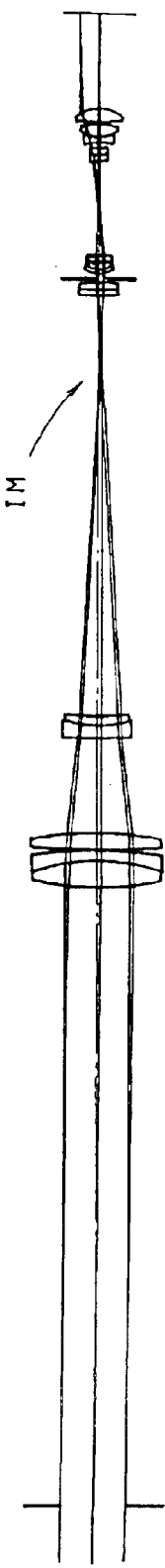

The zoom photographic optical system according to the first embodiment moves the second lens unit G2, the third lens unit G3 and the fourth lens unit G4 as described above and shown in FIG. 1A (the low magnification position), FIG. 1B (an intermediate magnification) and FIG. 1C (the high magnification position). When these lens units are moved, a focal length is changed from 45 mm (the low magnification position) to 180 mm (the intermediate magnification) and further to 900 mm (the high magnification position).

Furthermore, the optical system according to this embodiment has a field number of 8 at the focal length of 45 mm or a field number of 11 at focal lengths other than 45 mm.

For the optical system according to this embodiment, a diameter of the aperture stop S is set so that an exit side numerical aperture is 0.032 at focal lengths 45 mm to 180 mm. The aperture stop S is kept open at focal lengths from 180 mm to 900 mm. Accordingly, the optical system is configured so as not to limit a pupil diameter of 17.09 mm of the objective lens system by the aperture stop S. As a result, the optical system is capable of keeping constant brightness and preventing a light amount from being reduced at a marginal portion on an image surface at the low magnification position.

Since the third lens unit G3 is moved for a short distance in the optical system according to the first embodiment, an angle of incidence of a principal ray on an image surface I is limited within approximately 2 degrees in any condition during the magnification change. In other words, the optical system is configured so as to be effective for suppressing color shading which is a phenomenon characteristic of a CCD device.

The optical system according to the first embodiment is configured to form an intermediate image IM between the first lens unit G1 and the second lens unit G2 at the low magnification position. At the intermediate magnification and the high magnification position, the second lens unit G2 is moved toward the first lens unit G1 beyond a location of the intermediate image IM at the low magnification position. As a result, locations of intermediate images at the intermediate magnification and the high magnification position (IM in FIG. 1B and FIG. 1C) are shifted on the image side.

In the optical system according to the first embodiment, the intermediate image IM is relayed to the image surface I by the second lens unit G2 to the fifth lens unit G5 as shown in FIG. 1A. In order to shift a principal point on the image side, a wide space is reserved between the intermediate image IM and the second lens unit G2, whereas a narrow space is reserved between the second lens unit G2 and the fifth lens unit G5. The second lens unit G2 to the fifth lens unit G5 are disposed on a side of the image surface, thereby obtaining a contracting magnification.

At the intermediate magnification shown in FIG. 1B, the intermediate image IM is relayed to the image surface I by an optical system from the third lens unit G3 to the fifth lens unit G5. The third lens unit G3 functions as a field lens for the intermediate image. In other words, the third lens unit functions to prevent an offaxial light bundle from being eclipsed and correct offaxial aberrations. Furthermore, the fourth lens unit G4 is moved toward the third lens unit from a location of the fourth lens unit at the low magnification position to enhance a magnification of an optical system between the intermediate image IM and the image surface I.

At the high magnification position shown in FIG. 1C, the intermediate image IM is relayed to the image surface by the optical system from the third lens unit G3 to the fifth lens unit G5. Furthermore, the third lens unit G3 and the fourth lens unit G4 are moved toward the intermediate image. By moving these lens units, a principal point of the relay optical system is moved toward the intermediate image, thereby obtaining an enlarging magnification.

The zoom photographic optical system according to the first embodiment satisfies the condition (1) through the condition (7).

Though a composition of the objective lens system is not described in the numerical data of the first embodiment or FIG. 1A, FIG. 1B and FIG. 1C, the pupil of the objective lens system has a diameter of 17.09 mm and a distance as measured from the pupil of the objective lens system to the first lens unit G1 is 169 mm.

Figure 8:
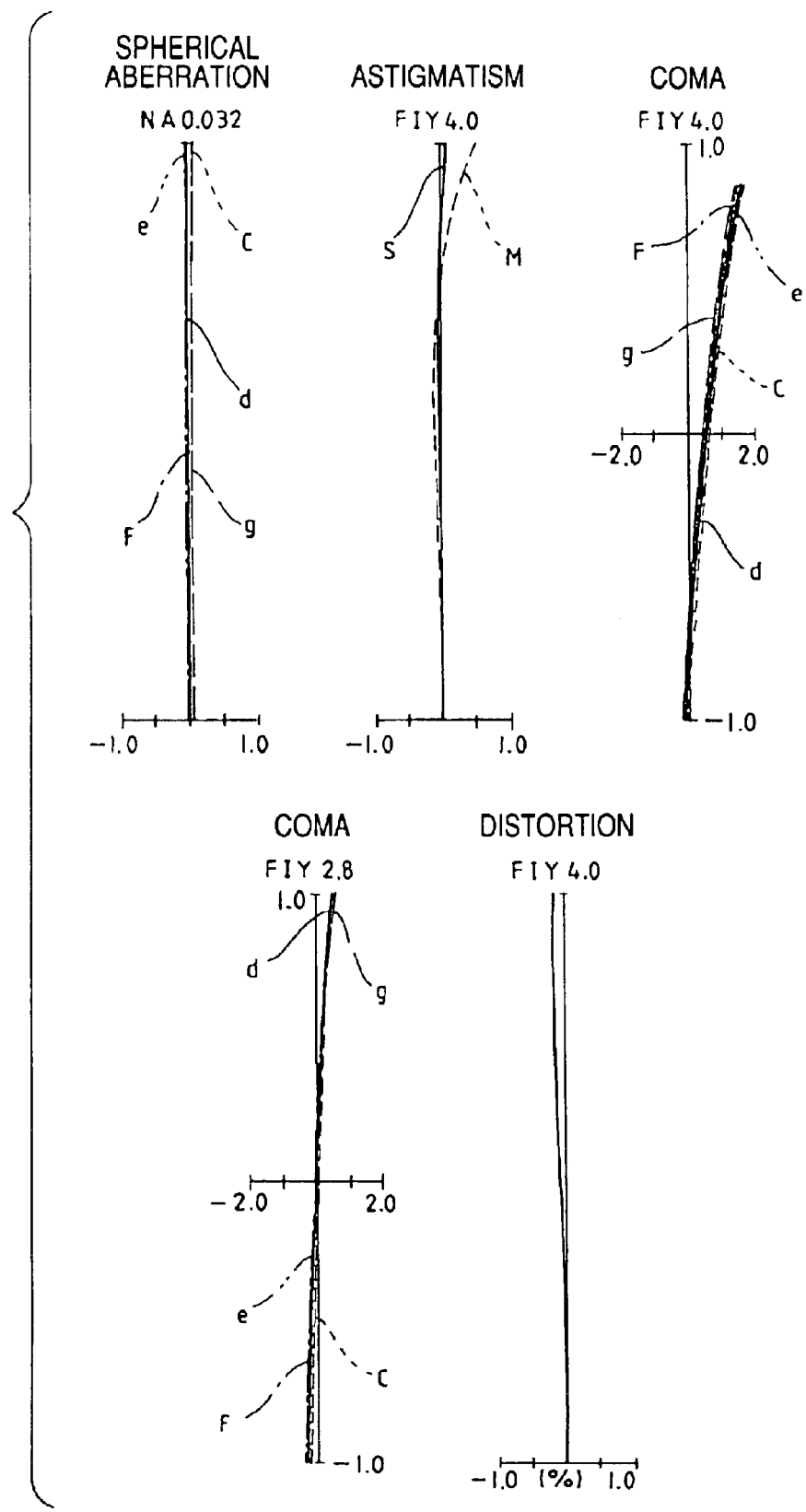
FIG. 8 shows curves illustrating aberrations produced by the first embodiment at a focal length of 45 mm.
Figure 9:
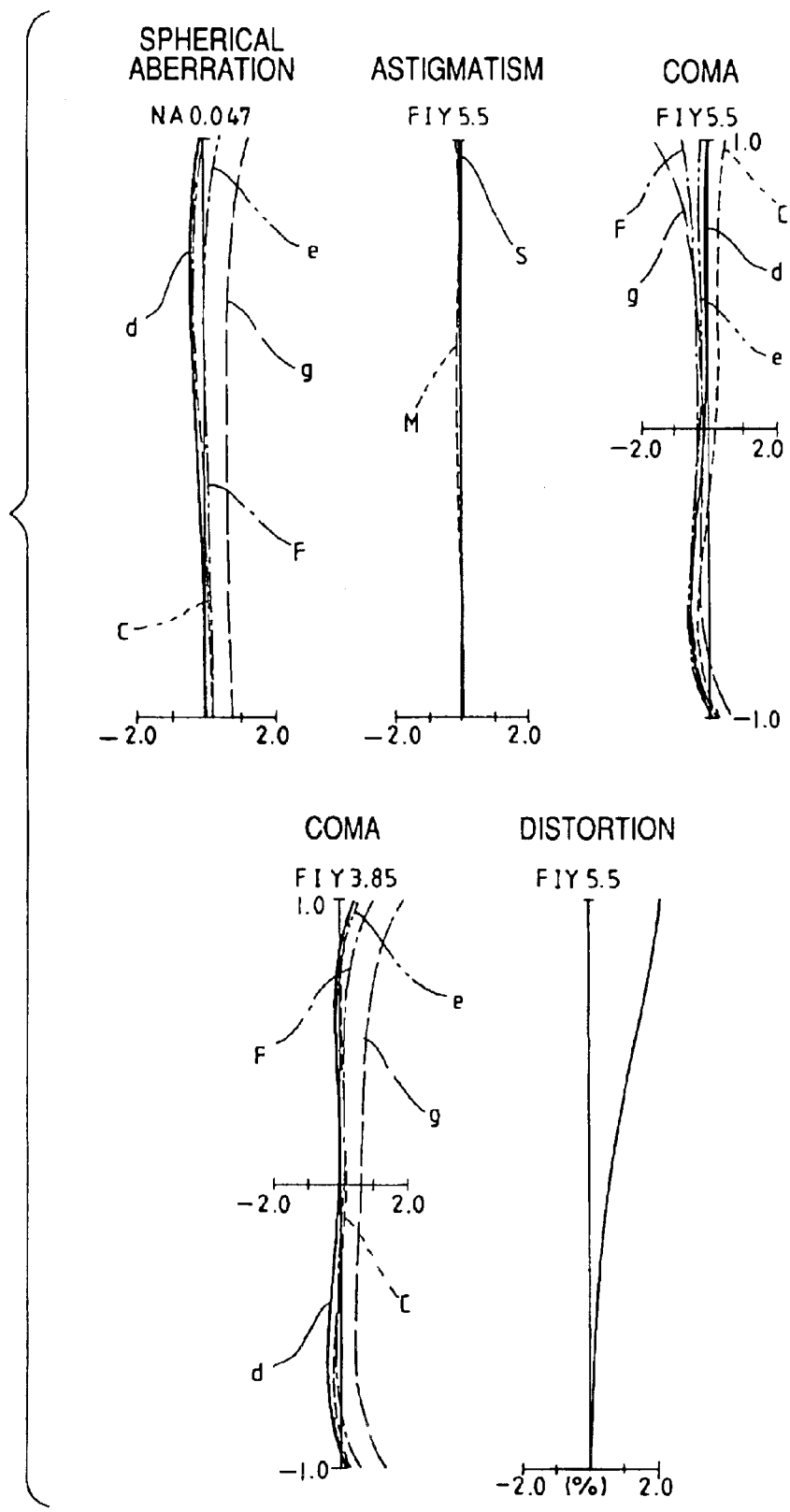
FIG. 9 shows curves illustrating aberrations produced by the first embodiment at a focal length of 180 mm.
Figure 10:
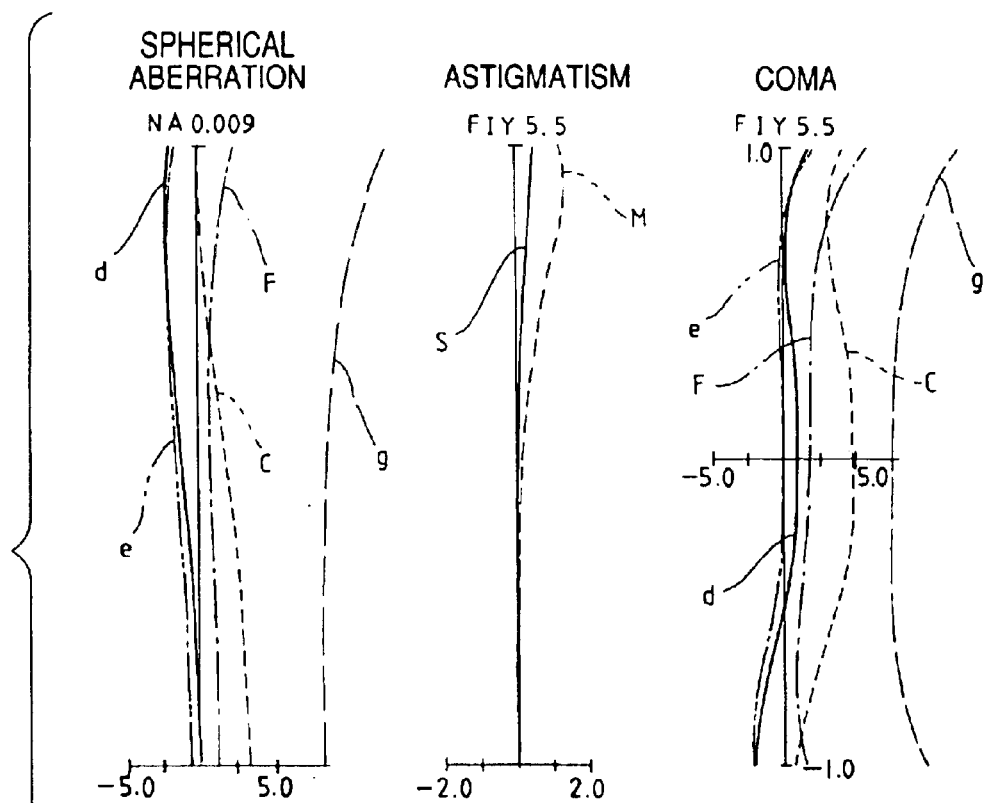
FIG. 10 shows curves illustrating aberrations produced by the first embodiment at a focal length of 900 mm.
Figure 10:
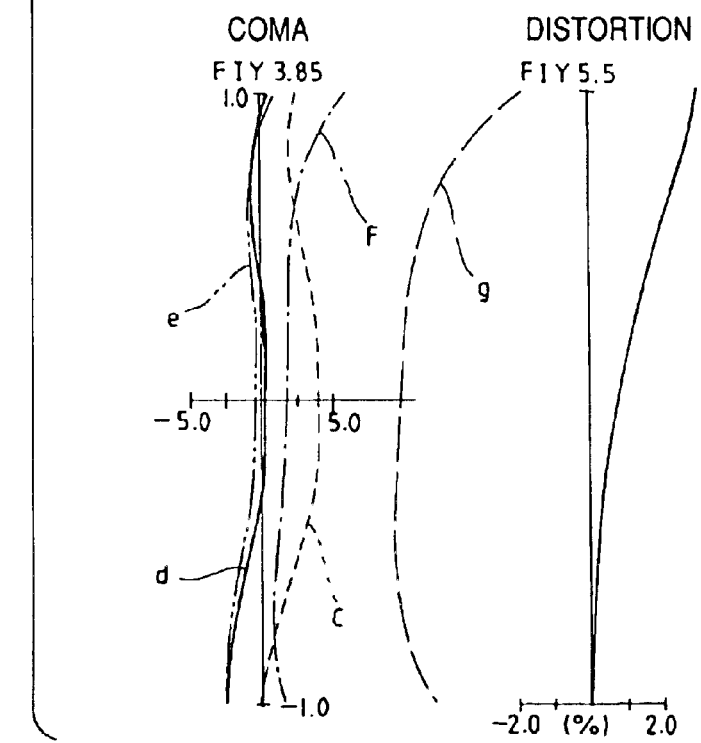

The optical system according to the first embodiment has aberration characteristics illustrated in FIG. 8 (at the focal length of 45 mm). FIG. 9 (at the focal length of 180 mm) and FIG. 10 (at the focal length of 900 mm).

A zoom photographic optical system according to the second embodiment of the present invention is shown in FIG. 2A, FIG. 2B and FIG. 2C, in which the zoom photographic optical system consists, in order from a rear side of an objective lens system, of a first lens unit G1 having positive refractive power, a second lens unit G2 having negative refractive power, a third lens unit G3 having positive refractive power, a fourth lens unit G4 having positive refractive power and a fifth lens unit G5 having positive refractive power. For changing a magnification from a low magnification position to a high magnification position, the second lens unit G2, the third lens unit G3 and the fourth lens unit G4 are moved along an optical axis. By moving these lens units, an airspace between the first lens unit G1 and the second lens unit G2 is narrowed, an airspace between the second lens unit G2 and the third lens unit G3 is widened, an airspace between the third lens unit G3 and the fourth lens unit G4 is first widened and then narrowed, and an airspace between the fourth lens unit G4 and the fifth lens unit G5 is widened.

In the optical system according to the second embodiment, the first lens unit G1 is composed of a front subunit G1F which is a negative cemented lens component having weak power consisting of a concave lens element and a convex lens element, and a rear subunit G1R which is a convex lens component. The second lens unit G2 is composed of a negative cemented lens component which consists of a negative meniscus lens element and a positive meniscus lens element. The third lens unit G3 is composed of a positive cemented lens component which consists of a negative meniscus lens element and a convex lens element. The fourth lens unit G4 is composed of a convex lens component and a positive cemented lens component which consists of a negative meniscus lens element and a convex lens element. The fifth lens unit G5 is composed of a negative cemented lens component which consists of a biconcave lens element and a positive meniscus lens element, a positive cemented lens component which consists of a biconcave lens element and a convex lens element, and a positive meniscus lens component.

In the optical system according to the second embodiment, a location which is conjugate with a pupil of the objective lens system is situated between the third lens unit G3 and the fourth lens unit G4. An aperture stop S is disposed in the vicinity of the location conjugate with the pupil. Furthermore, the aperture stop S is moved together with the fourth lens unit G4 for the magnification change.

The zoom photographic optical system according to the second embodiment moves the second lens unit G2, the third lens unit G3 and the fourth lens unit G4 for the magnification change as described above and shown in FIG. 2A (the low magnification position), FIG. 2B (an intermediate magnification) and FIG. 2C (the high magnification position). By this magnification change, a focal length is changed from 45 mm (the low magnification position) to 180 mm (the intermediate magnification) and further to 900 mm (the high magnification position). A field number is 8 at the focal length of 45 mm or 11 at other focal lengths.

In this optical system, a diameter of the aperture stop S is set so that an exit side numerical aperture is 0.032 at focal lengths from 45 mm to 180 mm. The aperture stop S is kept open at focal lengths from 180 mm to 900 mm. Therefore, the optical system is configured so as not to limit a pupil diameter of 17.09 mm of the objective lens system by the aperture stop S. As a result, the optical system is capable of keeping constant brightness and preventing a light amount from being reduced at a marginal portion on an image surface at the low magnification position.

In the optical system according to the second embodiment which moves the third lens unit G3 for a short distance, an angle of incidence of the principal ray is limited within 2 degrees in any condition of the magnification change. In other words, the optical system is configured to be effective for preventing color shading which is a phenomenon peculiar to a CCD device.

The optical system according to the second embodiment also satisfies the condition (1) through the condition (7). Furthermore, the lens units have functions similar to those of the lens units in the first embodiment.

Though a composition of the objective lens system is neither described in the numerical data nor the like of the second embodiment, a pupil of the objective lens system has a diameter of 17.09 mm and a distance as measured from the pupil of the objective lens system to the first lens unit G1 is 171 mm.

Figure 11:
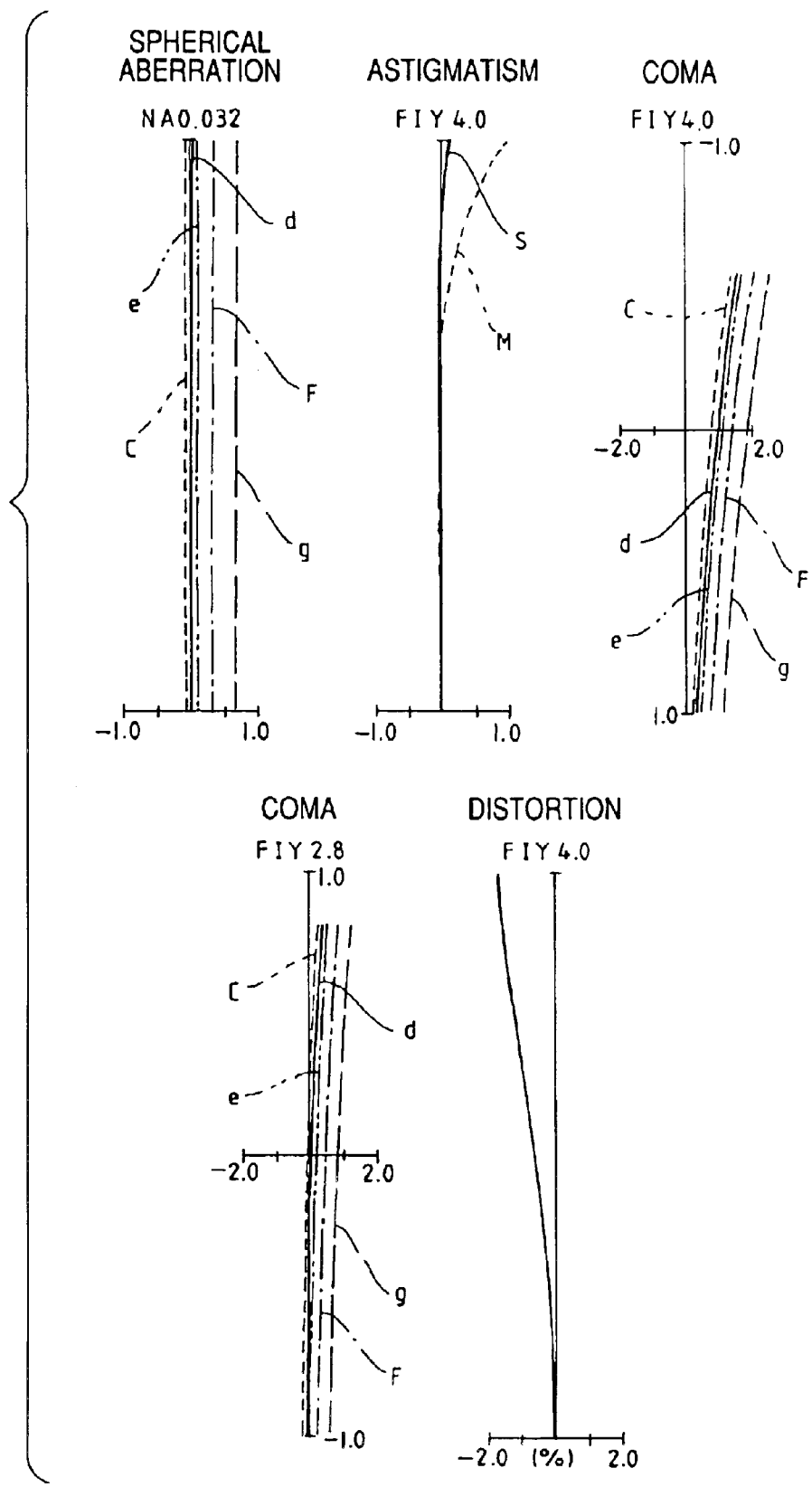
FIG. 11 shows curves illustrating aberrations produced by the second embodiment at a focal length of 45 mm.
Figure 12:
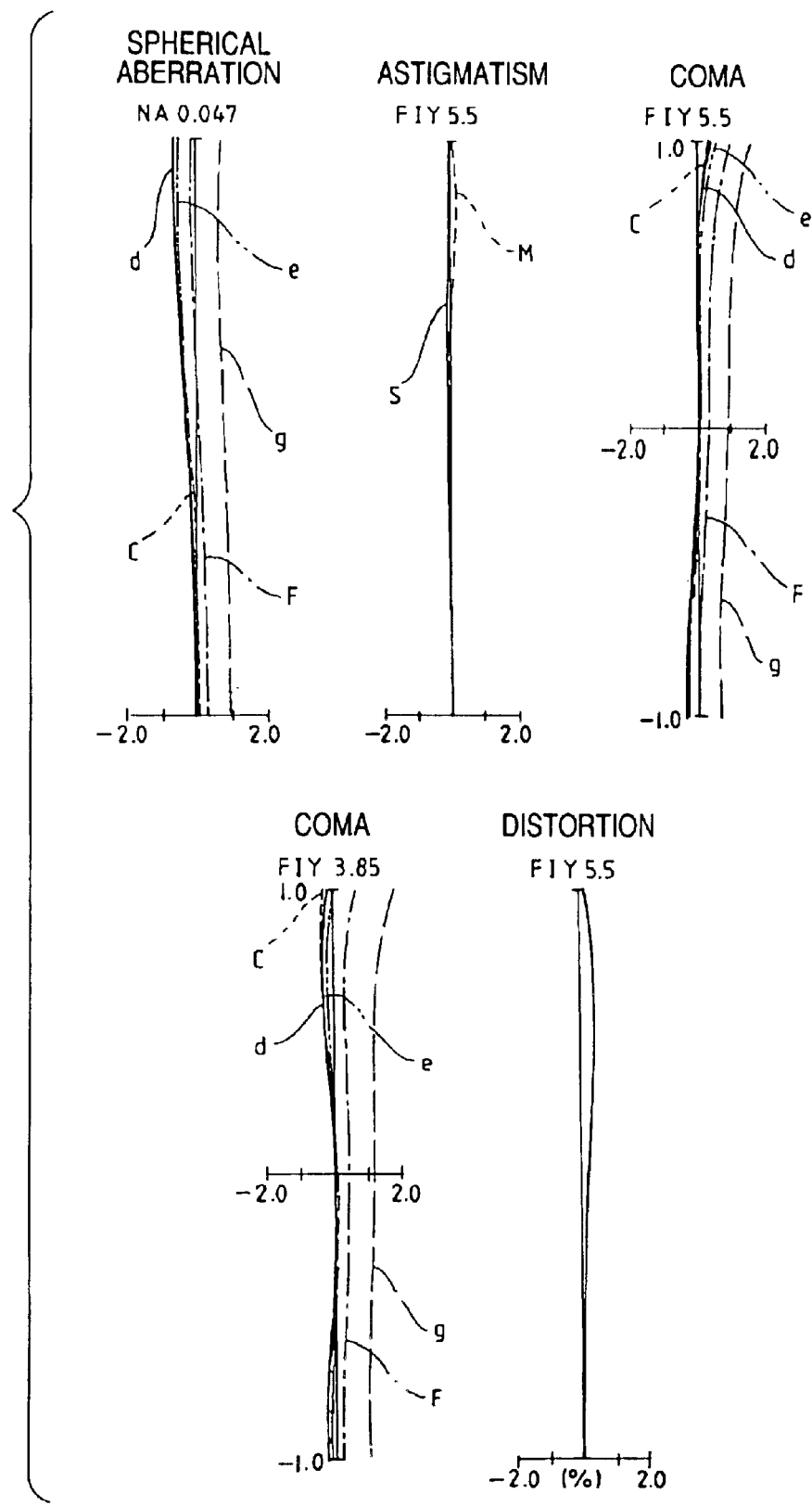
FIG. 12 shows curves illustrating aberrations produced by the second embodiment at a focal length of 180 mm.
Figure 13:
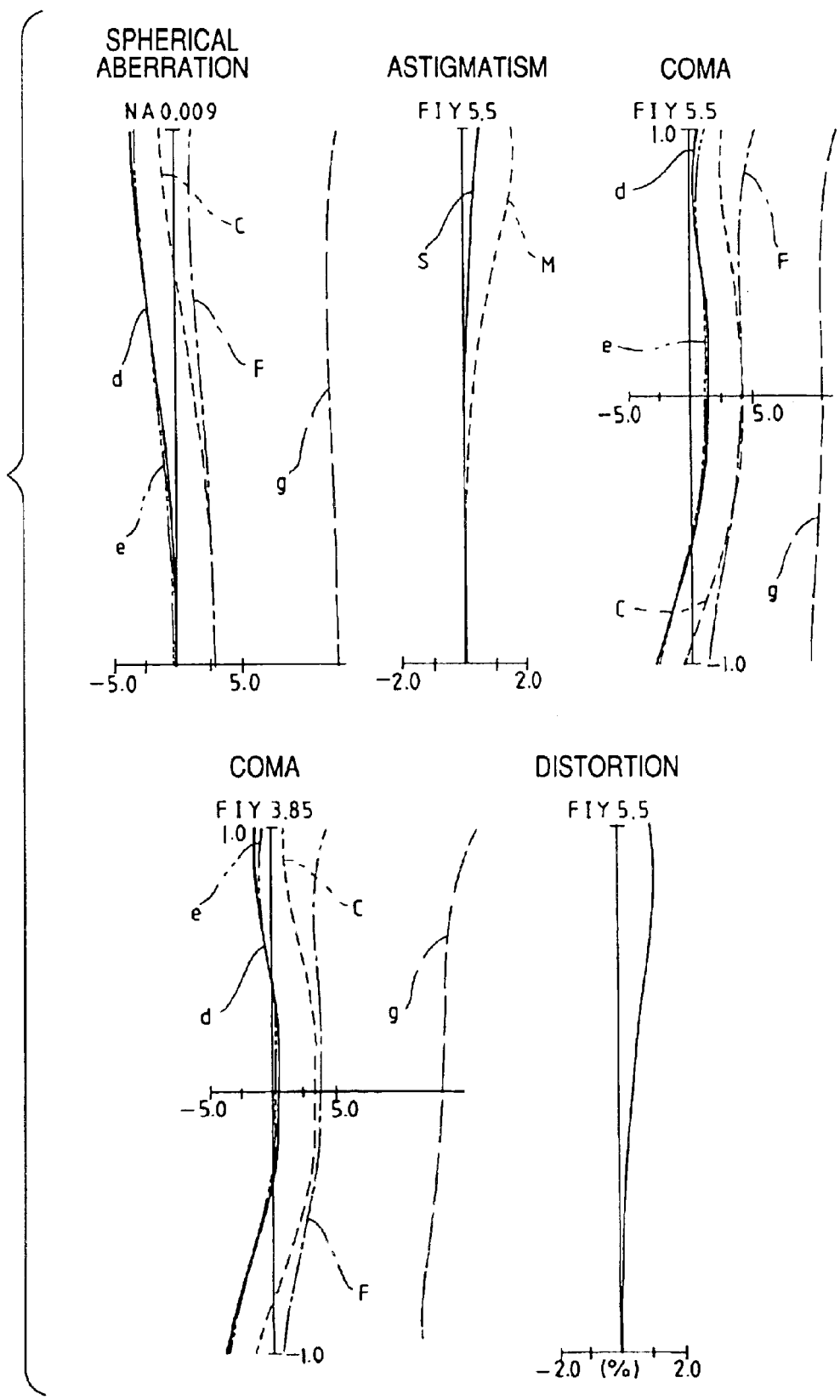
FIG. 13 shows curves illustrating aberrations produced by the second embodiment at a focal length of 900 mm.

The zoom photographic optical system according to the second embodiment has aberration characteristics illustrated in FIG. 11 (at the focal length of 45 mm), FIG. 12 (at the focal length of 180 mm) and FIG. 13 (at the focal length of 900 mm) respectively.

A zoom photographic optical system according to the third embodiment of the present invention is illustrated in FIG. 3A, FIG. 3B and FIG. 3C, in which the zoom photographic optical system consists, in order from a rear end of an objective lens system, of a first lens unit G1 having positive refractive power, a second lens unit G2 having negative refractive power, a third lens unit G3 having positive refractive power, a fourth lens unit G4 having positive refractive power and a fifth lens unit G5 having positive refractive power. For changing a magnification from a low magnification position to a high magnification position, the second lens unit G2, the third lens unit G3 and the fourth lens unit G4 are moved along an optical axis respectively. By moving these lens units, an airspace between the first lens unit G1 and the second lens unit G2 is narrowed, an airspace between the second lens unit G2 and the third lens unit G3 is first narrowed and then widened, an airspace between the third lens unit G3 and the fourth lens unit G4 is first widened and then narrowed, and an airspace between the fourth lens unit G4 and the fifth lens unit G5 is widened.

In this third embodiment, the first lens unit G1 is composed of a front subunit G1F consisting of a positive lens component and a positive cemented lens component having weak power which consists of a convex lens element and a concave lens element, and a rear subunit G1R 1 consisting of a positive lens component. The second lens unit G2 is composed of a negative cemented lens component which consists of a negative meniscus lens element and a positive meniscus lens element. The third lens unit G3 is composed of a positive cemented lens component which consists of a negative meniscus lens element and a convex lens element. The fourth lens unit G4 is composed of a positive meniscus lens component and a positive cemented lens component which consists of a negative meniscus lens element and a convex lens element. The fifth lens unit G5 is composed of a negative meniscus lens component having a gentle convex surface on a side of the fourth lens unit G4, and a negative cemented lens component which consists of a biconcave lens element and a positive lens element, and a positive meniscus lens component.

In the optical system according to the third embodiment, a location which is conjugate with a pupil of the objective lens system is situated between the third lens unit G3 and the fourth lens unit G4. An aperture stop S is disposed in the vicinity of the location conjugate with the pupil. Furthermore, the aperture stop S is moved together with the fourth lens unit G4 for the magnification change.

The zoom photographic optical system according to the third embodiment moves the second lens unit G2, the third lens unit G3 and the fourth lens unit G4 for the magnification change as described above and shown in FIG. 3A (the low magnification position), FIG. 3B (an intermediate magnification) and FIG. 3C (the high magnification position). By this magnification change, a focal length is changed from 45 mm (the low magnification position) to 180 mm (the intermediate magnification) and further to 900 mm (the high magnification position). In addition, a field number is 8 at the focal length of 45 mm or 11 at other focal lengths.

A diameter of the aperture stop S is set so that an exit side numerical aperture is 0.032 at focal length s from 45 mm to 180 mm. The aperture stop S is kept open at focal lengths from 180 mm to 900 mm. The optical system is therefore configured so not to limit a pupil diameter of 17.09 mm of the objective lens system by the aperture stop S. As a result, the optical system is capable of maintaining constant brightness and preventing a light amount from being reduced at a marginal portion on an image surface at the low magnification position.

Since the third lens unit G3 is moved for a short distance in the optical system according to the third embodiment, an angle of incidence of the principal ray on the image surface I is limited within approximately 2 degrees in any condition of the magnification change. In other words, the optical system is configured so as to be effective for suppressing color shading.

The optical system according to the third embodiment satisfies the condition (1) through the condition (8). Furthermore, each lens unit has a function which is similar to that in the first embodiment.

The optical system according to the third embodiment is preferable for layout of the lens units since the first lens unit G1 consists of the front subunit G1F and the rear subunit G1R, and the second lens unit G2 is moved for a short distance. Though a composition of the objective lens system is not described in the numerical data, the pupil of the objective lens system has a diameter of 17.09 mm and a distances as measured from the pupil of the objective lens system to the first lens unit G1 is 171 mm.

Figure 14:
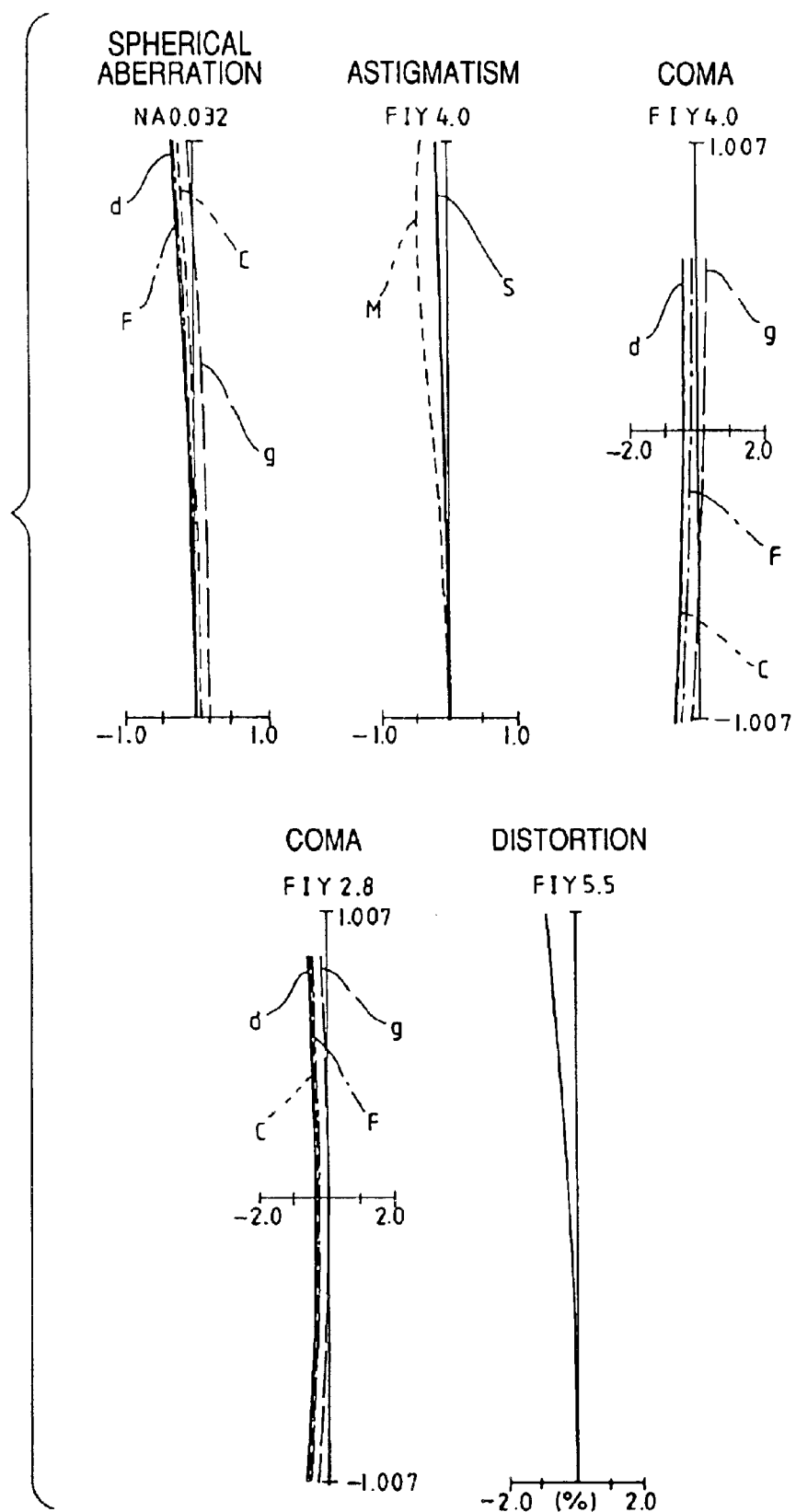
FIG. 14 shows curves illustrating aberrations produced by the third embodiment at a focal length of 45 mm.
Figure 15:
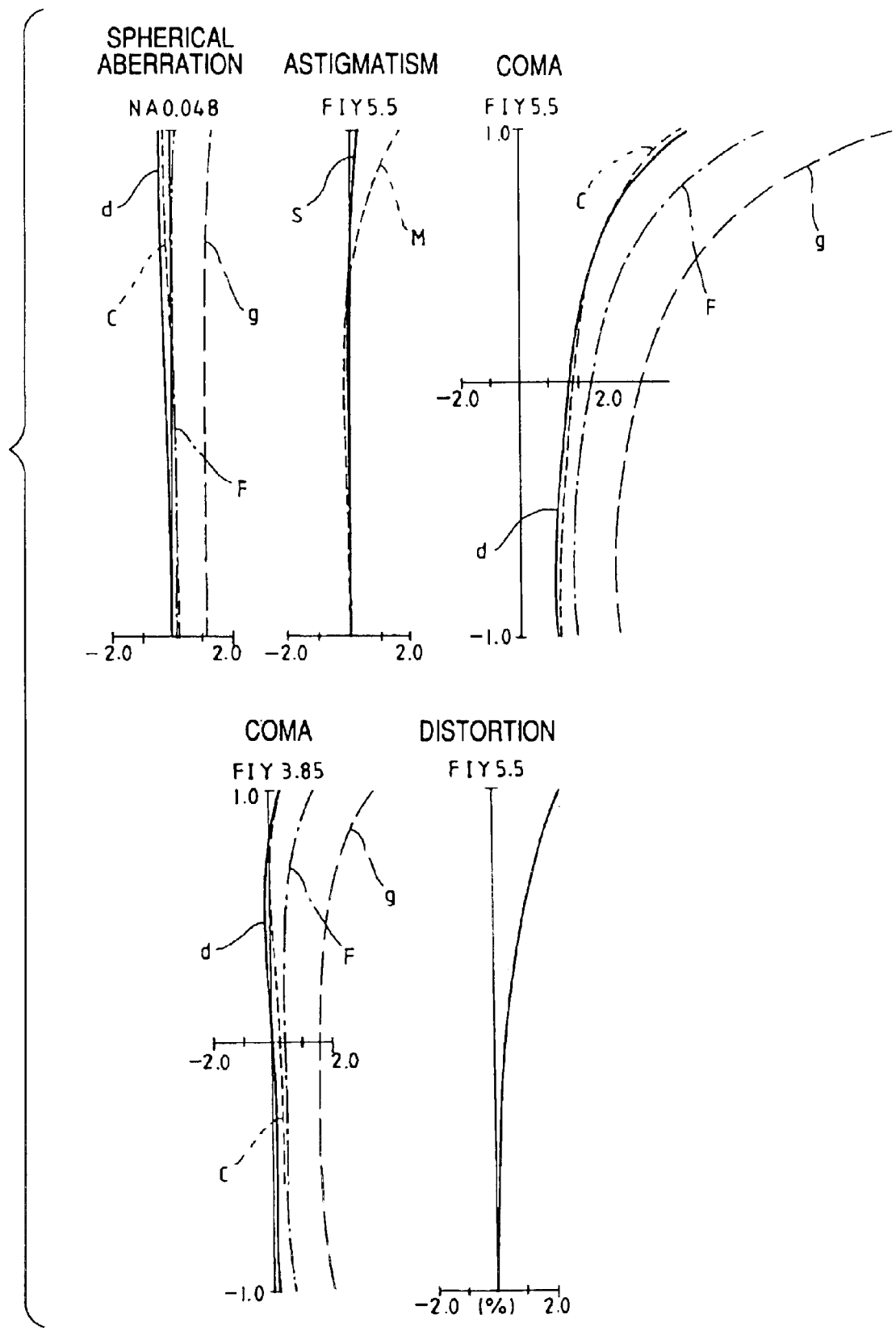
FIG. 15 shows curves illustrating aberrations produced by the third embodiment at a focal length 180 mm.
Figure 16:
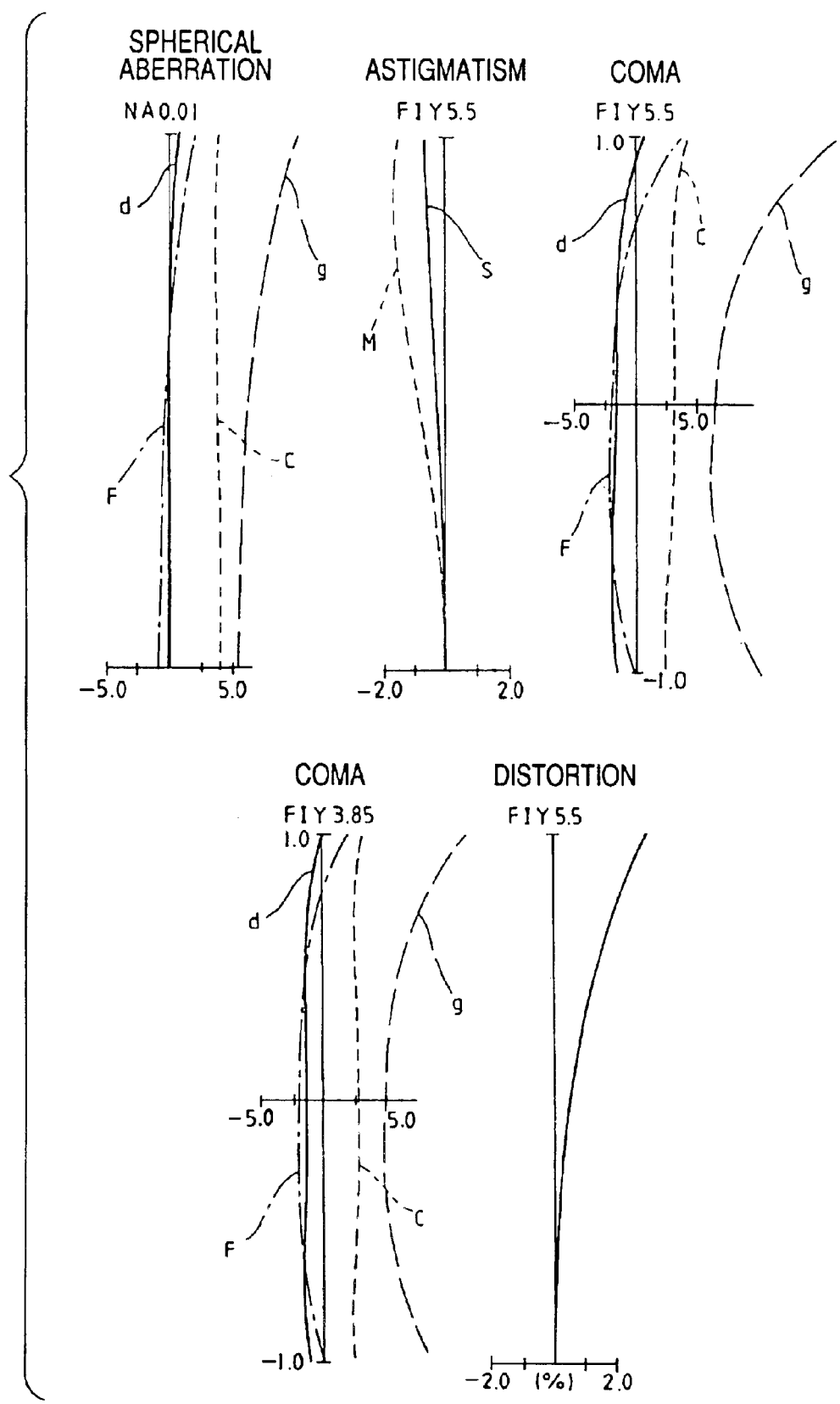
FIG. 16 shows curves illustrating aberrations produced by the third embodiment at a focal length of 900 mm.

Aberration characteristics of the optical system according to the third embodiment are illustrated in FIG. 14 (at the focal length of 45 mm), FIG. 15 (at the focal length of 180 mm) and FIG. 16 (at the focal length of 900 mm) respectively.

A zoom photographic optical system according to the fourth embodiment of the present invention has a composition shown in FIG. 4A, FIG. 4B and FIG. 4C. Speaking concretely, the zoom photographic optical system consists, in order from a rear side of an objective lens system, of a first lens unit G1 having positive refractive power, a second lens unit G2 having negative refractive power and a third lens unit G3 having positive refractive power. For changing a magnification from a low magnification position to a high magnification position, the second lens unit G2 and the third lens unit G3 are moved along an optical axis. By moving these lens units, an airspace between the first lens unit G1 and the second lens unit G2 is shortened, whereas an airspace between the second lens unit G2 and the third lens unit G3 is prolonged.

In the optical system according to the fourth embodiment, the first lens unit G1 is composed of a front subunit G1F consisting of a convex lens component and a cemented lens component having weak power which consists of a convex lens element and a concave lens element, and a rear subunit G1R consisting of a positive lens component. The second lens unit G2 is composed of a negative cemented meniscus lens component which consists of a negative meniscus lens element and a positive meniscus lens element. Furthermore, the third lens unit G3 is composed of a positive cemented lens component which consists of a negative meniscus lens element and a convex lens element, a positive lens component, a negative meniscus lens component having a strongly concave surface on the image side, a negative cemented lens component which consists of a biconcave lens element having a concave surface on a side of the second lens unit G2 and a biconvex lens element, and a positive meniscus lens component.

Two aperture stops S1 (a ninth surface) and S2 (a twenty-fifth surface) are disposed in the optical system according to the fourth embodiment. At the low magnification position at which a location conjugate with a pupil of the objective lens system is situated in the vicinity of the second lens unit G2, the aperture stop S1 is disposed in the vicinity of the second lens unit G2. At an intermediate magnification at which the location conjugate with the pupil of the objective lens system is situated in the vicinity of the third lens unit G3, the aperture stop S2 is disposed in the third lens unit G3. In other words, the aperture stop S2 is stopped down to limit an aperture of the objective lens system and the aperture stop S2 is kept open. At the intermediate magnification, the aperture stop S1 is kept open and the aperture stop S2 is stopped down to limit the aperture of the objective lens system. At the high magnification position, the aperture stops S1 and S2 are kept open.

The optical system according to the fourth embodiment moves the second lens unit G2, the third lens unit G3 change as shown in FIG. 4A (the low magnification position), FIG. 4B (the intermediate magnification) and FIG. 4C (the high magnification position). By this magnification change, a focal length is changed from 45 mm (the low magnification position) to 144 mm (the intermediate magnification) and further to 360 mm (the high magnification position). In addition, a field number is 8 at the focal length of 45 mm or 11 at other focal lengths.

Furthermore, diameters of the aperture stops S1 and S2 are set so that an exit side numerical aperture is 0.03 at focal lengths from 45 mm to 144 mm. Furthermore, the aperture stops S1 and S2 are kept open at focal lengths from 144 mm to 360 mm. Accordingly, the optical system is configured so as not to limit a pupil diameter of 14.4 mm of the objective lens system by the aperture stops S1 and S2. As a result, the optical system is capable of maintaining constant brightness and preventing a light amount from being reduced at a marginal portion on an image surface at the low magnification position.

Though the optical system according to the fourth embodiment consists of the lens units in a number as small as three, the optical system satisfies the conditions (1) through the condition (6), thereby being a zoom optical system having a high vari-focal ratio and excellent aberration correcting performance.

Furthermore, the optical system according to the fourth embodiment satisfies the condition (8). This optical system is therefore allows the second lens unit G2 to have a short moving distance and has a composition preferable for layout of the lens units.

Though a composition of the objective lens system is not described either in the numerical data of the fourth embodiment, the pupil of the objective lens system has a diameter of 14.4 mm and a distance as measured from the pupil to the first lens unit is set at 121 mm.

Figure 17:
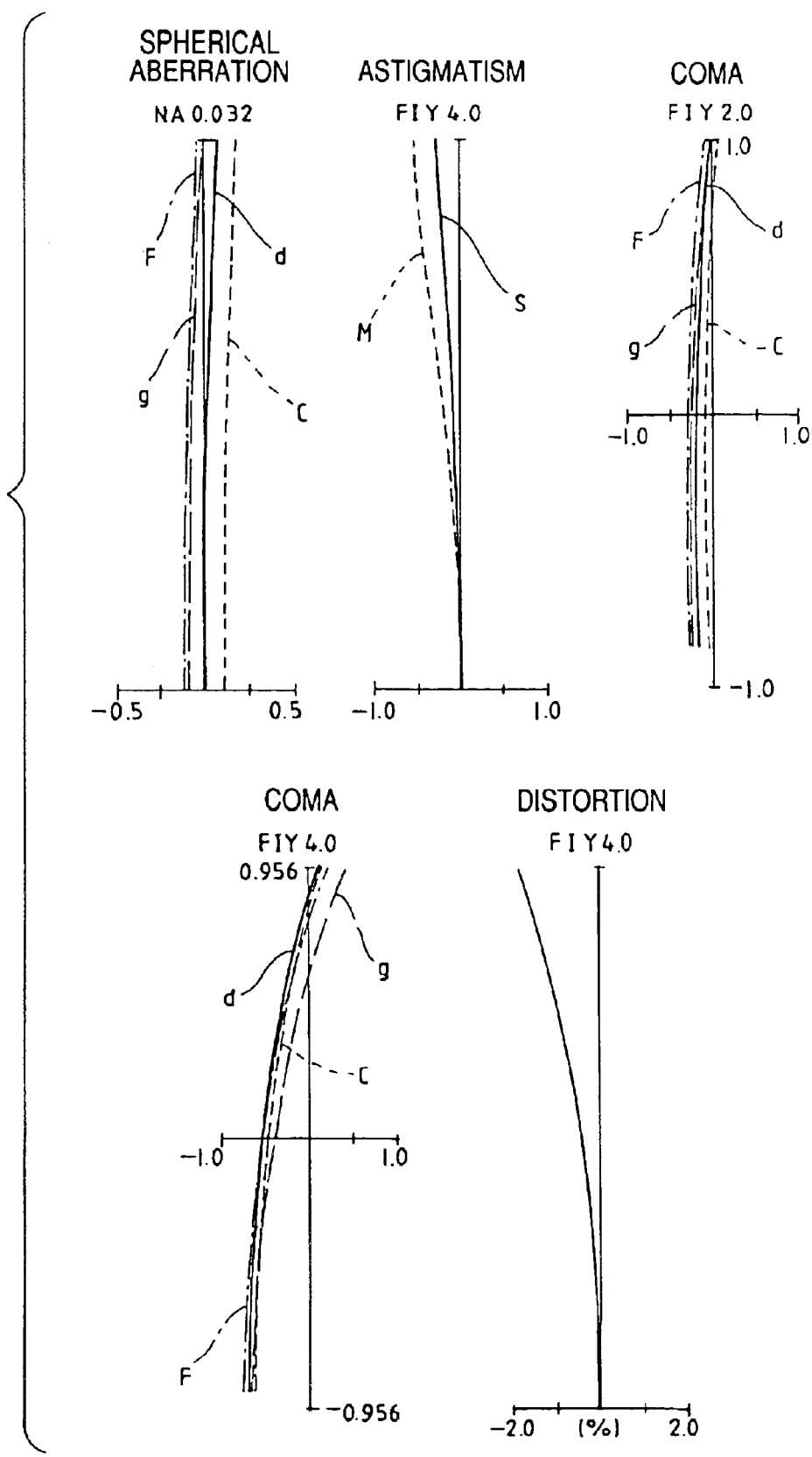
FIG. 17 shows curves illustrating aberrations produced by the fourth embodiment at a focal length of 45 mm.
Figure 18:
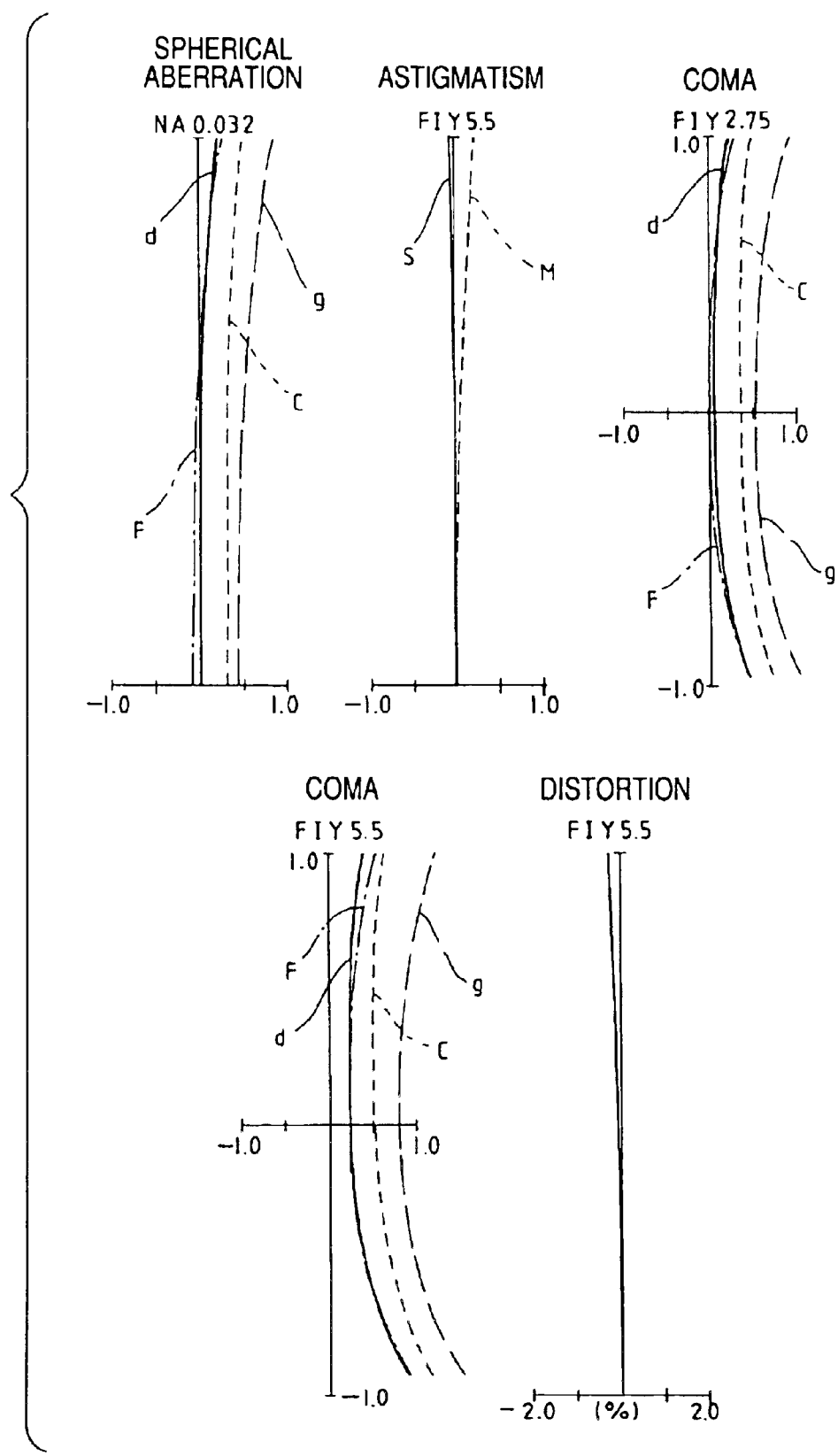
FIG. 18 shows curves illustrating aberrations produced by the fourth embodiment at a focal length of 144 mm.
Figure 19:
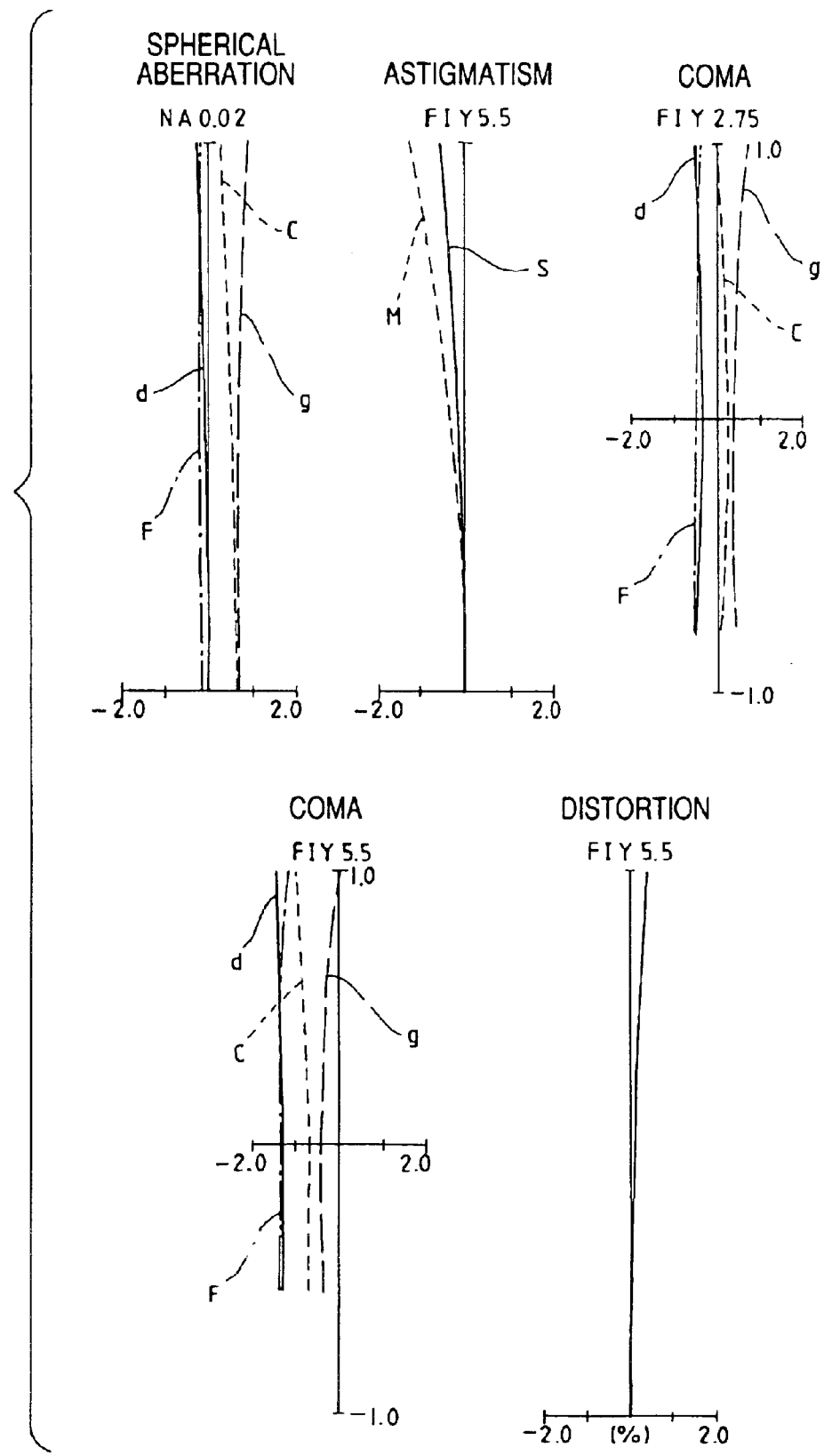
FIG. 19 shows curves illustrating aberrations produced by the fourth embodiment at a focal length of 360 mm.

Aberration characteristics of the optical system according to the fourth embodiment are illustrated in FIG. 17 (at the focal length of 45 mm), FIG. 18 (at the focal length of 144 mm) and FIG. 19 (at the focal length of 360 mm) respectively.

A zoom photographic optical system according to the fifth embodiment of the present invention has a composition shown in FIG. 5A, FIG. 5B and FIG. 5C. The optical system consists, in order from a rear side of an objective lens system, of a firs lens unit G1 having positive refractive power, a second lens unit G2 having negative refractive power, a third lens unit G3 having positive refractive power and a fourth lens unit G4 having negative refractive power. For changing a magnification from a low magnification position to a high magnification position, the second lens unit G2, the third lens unit G3 and the fourth lens unit G4 are moved along an optical axis. When these lens units are moved, an airspace between the first lens unit G1 and the second lens unit G2 is narrowed, an airspace between the second lens unit G2 and the third lens unit G3 is widened, and an airspace between the third lens unit G3 and the fourth lens unit G4 is widened.

In the optical system according to the fifth embodiment, the first lens unit G1 is composed of a front subunit G1F consisting of a positive lens component and a negative cemented lens component having weak power which consists of a convex lens element and a concave lens element, and a rear subunit G1R consisting of a positive lens component. Furthermore, the second lens unit G2 is composed of a negative cemented lens component which consists of a negative meniscus lens element and a positive meniscus lens element. The third lens unit G3 is composed of a positive cemented lens component which consists of a negative meniscus lens element and a convex lens element, and a positive lens component. Furthermore, the fourth lens unit G4 is composed of a negative meniscus lens component having a concave surface on a side of an image surface, a negative cemented lens component which consists of a biconcave lens element having a strongly concave surface on a side of the third lens unit and a biconvex lens element, and a convex lens component.

Two aperture stops S1 (a twelfth surface) and S2 (an eighteenth surface) are disposed in the optical system according to the fifth embodiment. At the low magnification position at which a location conjugate with a pupil of the objective lens system is situated in the vicinity of the third lens unit G3, the aperture stop S1 is disposed in the vicinity of the third lens unit. At an intermediate magnification at which the location conjugate with the pupil of the objective lens system is situated between the third lens unit G3 and the fourth lens unit G4, the aperture stop S2 is disposed between the third lens unit G3 and the fourth lens unit G4. In other words, the aperture stop S1 is stopped down to limit an aperture of the objective lens system and the aperture stop S2 is kept open at the low magnification position. A the intermediate magnification, the aperture stop S1 is kept open and the aperture stop S2 is stopped down to limit the aperture of the objective lens system. At the high magnification position, both the aperture stops S1 and S2 are kept open.

The optical system according to the fifth embodiment moves the second lens unit G2, the third lens unit G3 and the fourth lens unit G4 for the magnification change as described above and shown in FIG. 5A (the low magnification position), FIG. 5B (the intermediate magnification) and FIG. 5C (the high magnification position). By this magnification change, a focal length is changed from 45 mm (the low magnification position) to 144 mm (the intermediate magnification) and further to 360 mm (the high magnification position). In addition, a field number is 8 at the focal length of 45 mm or 11 at other focal lengths.

Furthermore, diameters of the aperture stops S1 and S2 are set so that an exit side numerical aperture is 0.032 at focal lengths from 45 mm to 144 mm. At focal lengths from 144 mm to 360 mm, the aperture stops S1 and S2 are kept open. Accordingly, the optical system is configured so as not to limit a pupil diameter of 14.4 mm of the objective lens system by the aperture stops S1 and S2. As a result, the optical system is capable of maintaining constant brightness and preventing a light amount from being reduced at a marginal portion on an image surface at the low magnification position.

The optical system according to the fifth embodiment satisfies the condition (1) through the condition (7), thereby being an optical system having a high vari-focal ratio and excellent aberration correcting performance.

In the optical system according to the fifth embodiment which consists of the four lens units, an angle of incidence of the principal ray on the image surface is suppressed to approximately 2 degrees in any condition of the magnification change. In other words, the optical system according to the fifth embodiment is configured to be effective for suppressing color shading which is a phenomenon characteristic of a CCD device.

Furthermore, the first lens unit of the optical system according to the fifth embodiment is configured to satisfy the condition (8). Accordingly, the second lens unit can have a short moving distance for the magnification change, which is preferable for layout of the lens units. Though a composition of the objective lens system is not described in the numerical data, a pupil of the objective lens system has a diameter of 14.4 mm and a distance as measured from the pupil of the objective lens system to the first lens unit is set at 121 mm.

Figure 20:
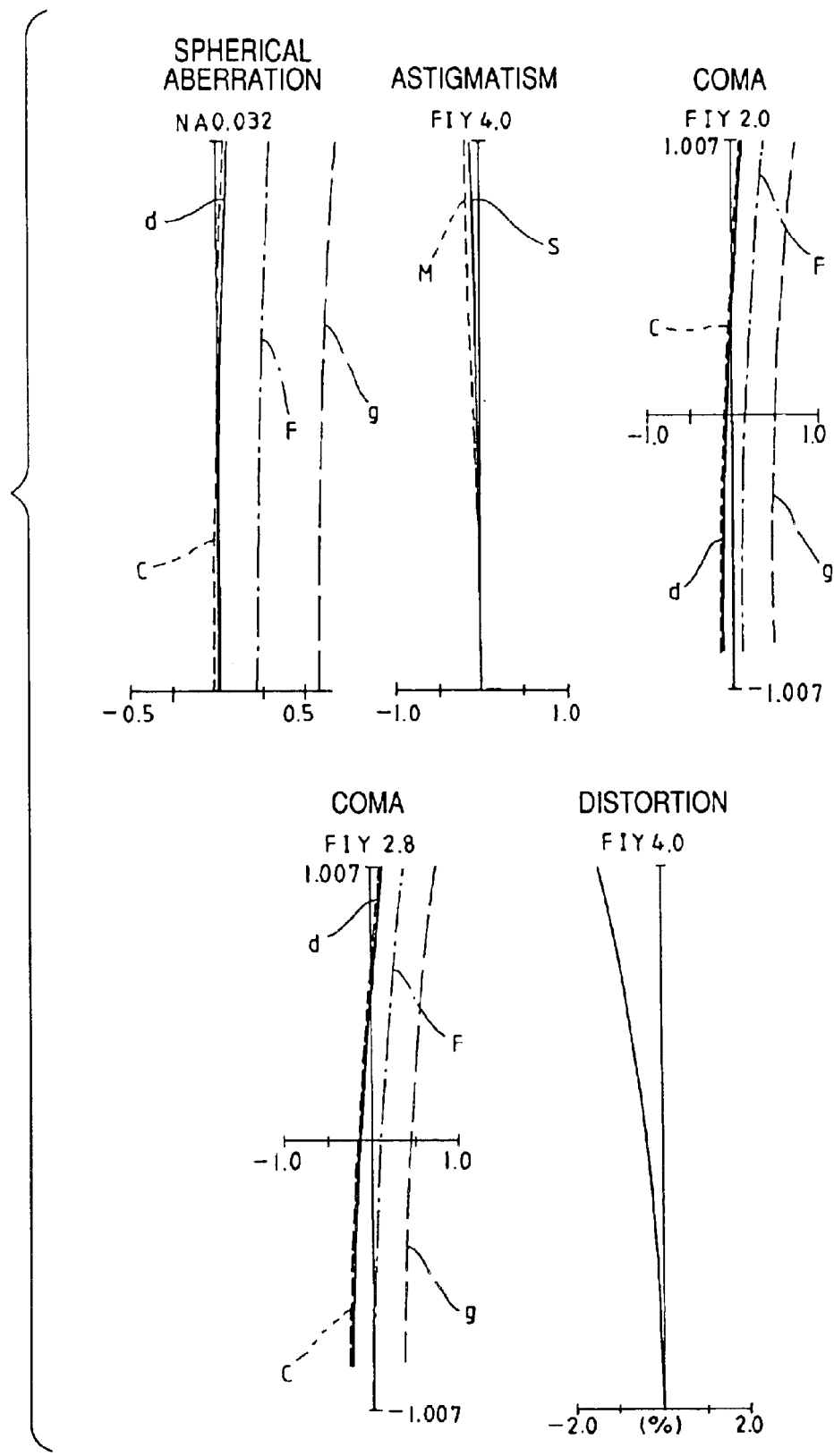
FIG. 20 shows curves illustrating aberrations produced by the fifth embodiment at a focal length of 45 mm.
Figure 21:
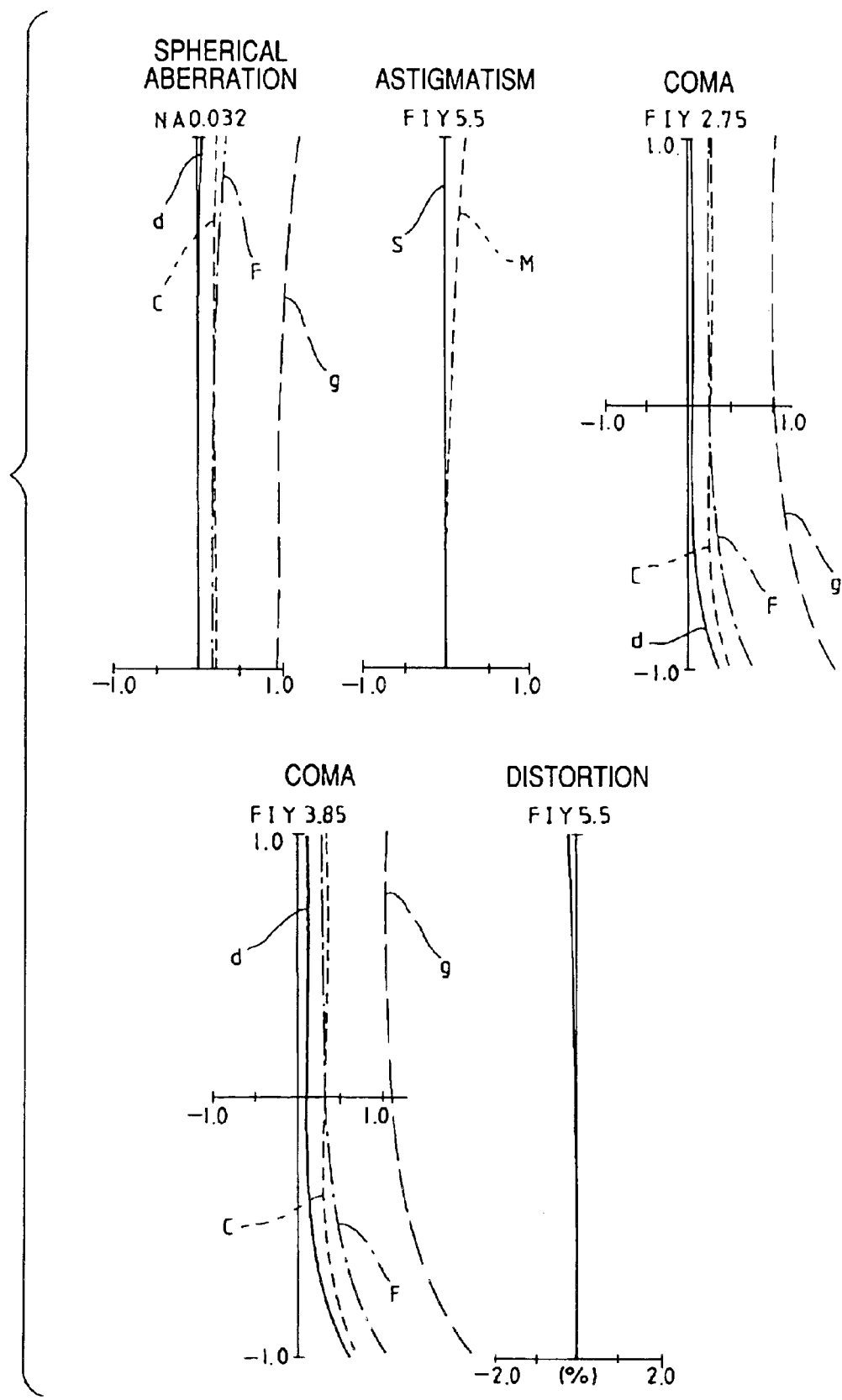
FIG. 21 shows curves illustrating aberrations produced by the fifth embodiment at a focal length of 144 mm.
Figure 22:
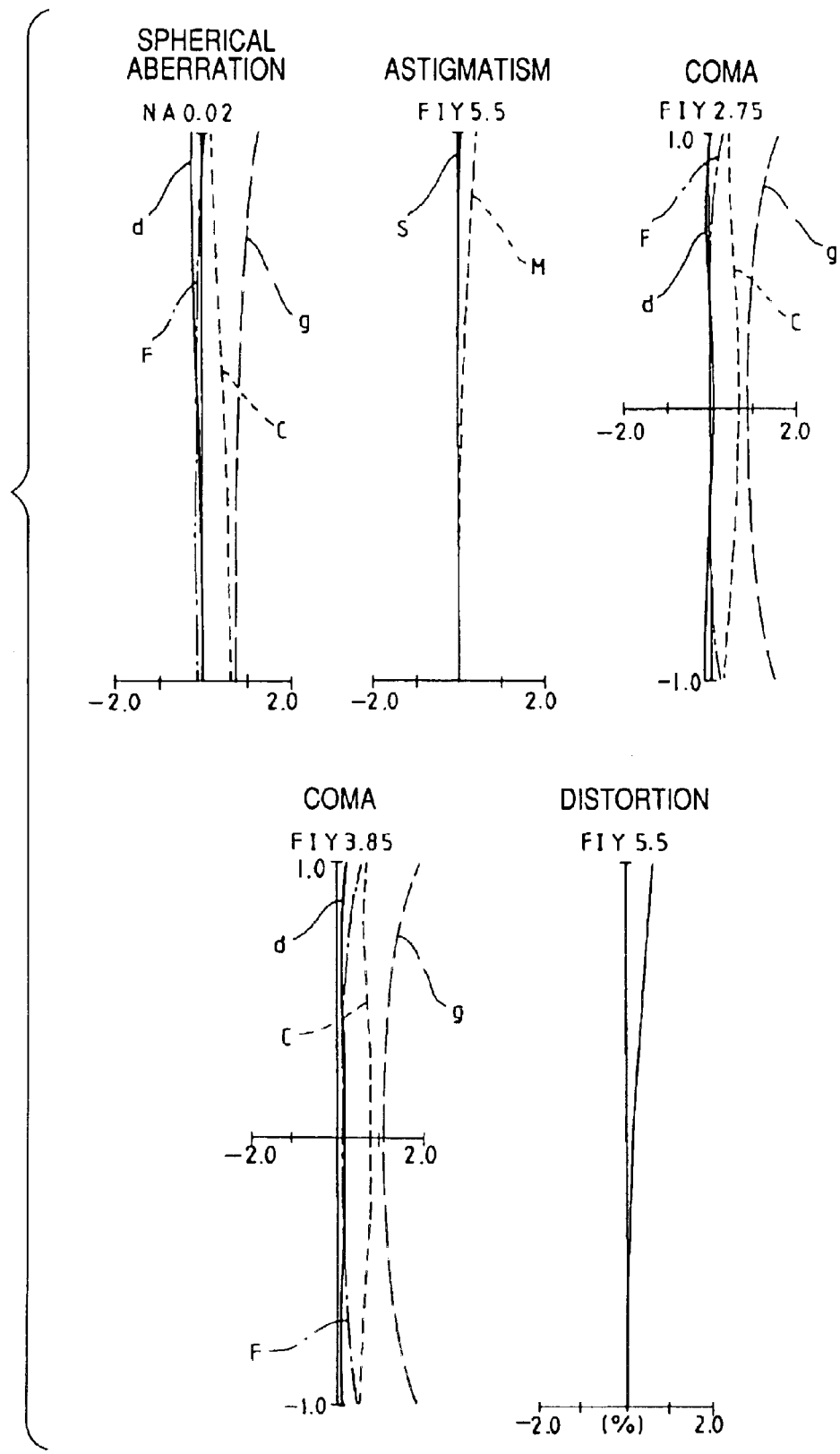
FIG. 22 shows curves illustrating aberrations produced by the fifth embodiment at a focal length of 360 mm.

Aberration characteristics of the optical system are illustrated in FIG. 20 (at the focal length of 45 mm), FIG. 21 (at the focal length of 144 mm) and FIG. 22 (at the focal length of 360 mm) respectively.

Figure 6A:
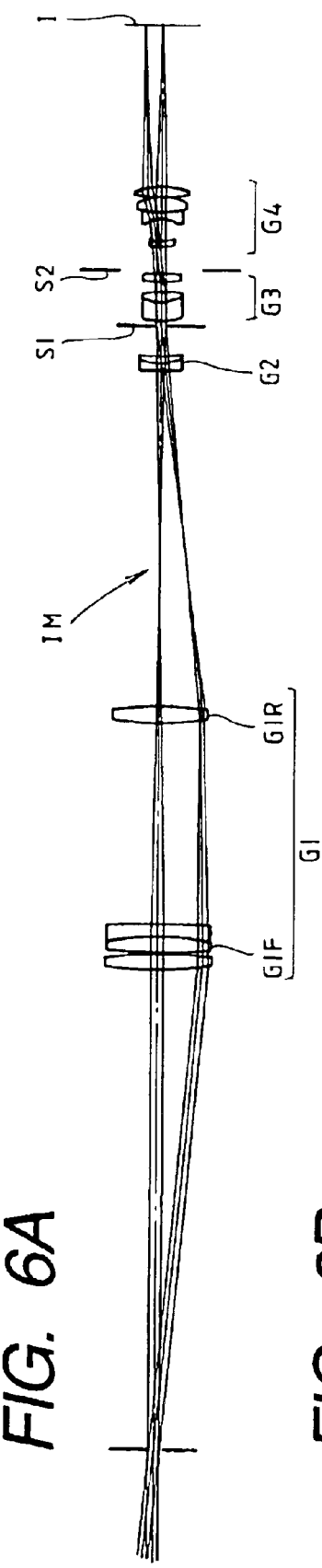
FIG. 6A, FIG. 6B and FIG. 6C are sectional views showing a composition of a sixth embodiment of the present invention.
Figure 6B:
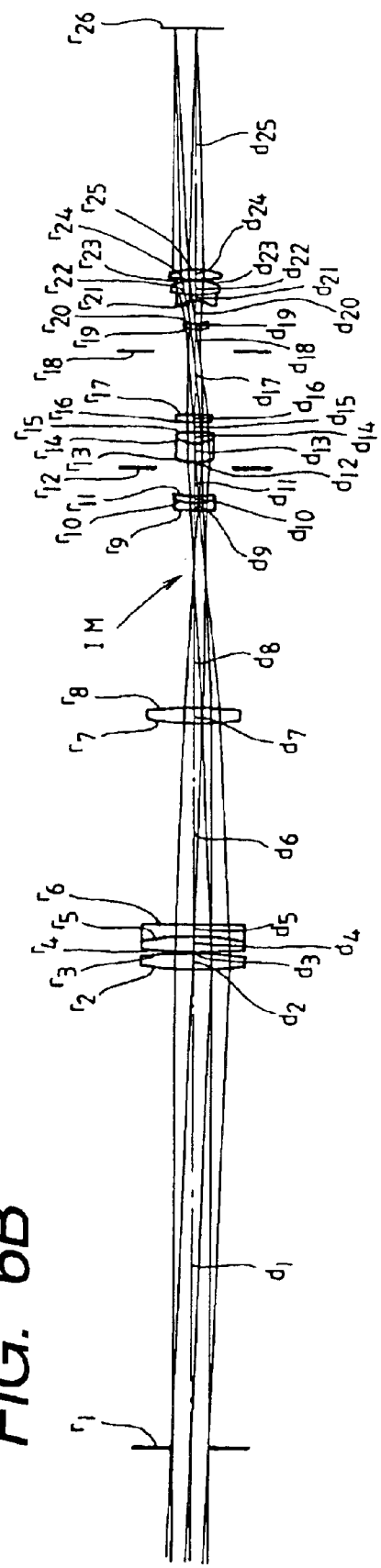
Figure 6C:
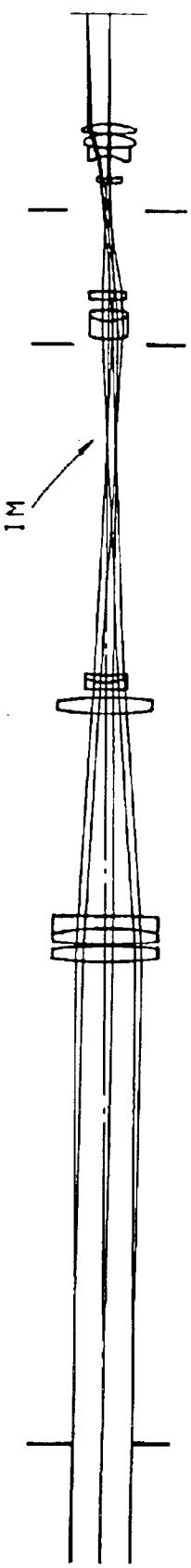

A zoom photographic optical system according to the sixth embodiment of the present invention has a composition shown in FIG. 6A, FIG. 6B and FIG. 6C. The zoom photographic optical system consists, in order from a rear side of an objective lens system, of a first lens unit G1 having positive refractive power, a second lens unit G2 having negative refractive power, a third lens unit G3 having positive refractive power and a fourth lens unit G4 having positive refractive power. For changing a magnification from a low magnification position to a high magnification position, the second lens unit G2, the third lens unit G3 and the fourth lens unit G4 are moved along an optical axis. When these lens unit are moved, an airspace between the first lens unit G1 and the second lens unit G2 is narrowed, an airspace between the second lens unit G2 and the third lens unit G3 is first narrowed and then widened, and an airspace between the third lens unit G3 and the fourth lens unit G4 is widened.

In the optical system according to the sixth embodiment, the first lens unit G1 is composed of a front subunit G1F consisting of a positive lens component and a negative cemented lens component having weak power which consists of a convex lens element and a concave lens element, and a rear subunit C1R consisting of a positive lens component. Furthermore, the second lens unit G2 is composed of a negative cemented meniscus lens component consisting of a negative meniscus lens element and a positive meniscus lens element. The third lens unit G3 is composed of a positive cemented lens component which consists of a negative meniscus lens element and a convex lens element, and a positive lens component. Furthermore, the fourth lens unit G4 is composed of a negative meniscus lens component having a concave surface on a side of an image surface, a negative cemented lens component which consists of a biconcave lens element and a biconvex lens element, and a convex lens component.

Two aperture stops S1 (a twelfth surface) and S2 (an eighteenth surface) are disposed in the optical system according to the sixth embodiment. At the low magnification position at which a location conjugate with a pupil of the objective lens system is situated in the vicinity of the third lens unit G3, the aperture stop S1 is disposed in the vicinity of the third lens unit G3. At an intermediate magnification at which the location conjugate with the pupil of the objective lens system is situated between the third lens unit G3 and the fourth lens unit G4, the aperture stop S2 is disposed between the third lens unit G3 and the fourth lens unit G4. In other words, the aperture stop S1 is stopped down to limit an aperture of the objective lens system and the aperture stop S2 is kept open on a side of the low magnification position. At the intermediate magnification, the aperture stop S1 is kept open and a diameter of the aperture stop S2 is limited to limit the aperture of the objective lens system. At the high magnification position, both the aperture stops S1 and S2 are kept open.

The zoom photographic optical system according to the sixth embodiment moves the second lens unit G2, the third lens unit G3 and the fourth lens unit G4 for the magnification change as described above and shown in FIG. 6A (the low magnification position), FIG. 6B (the intermediate magnification) and FIG. 6C (the high magnification position). By this magnification change, a focal length is changed from 45 mm (the low magnification position) to 144 mm (the intermediate magnification) and further to 360 mm (the high magnification position). In addition a field number is 8 at the focal length of 45 mm or 11 at other focal lengths.

Furthermore, diameters of the aperture stops S1 and S2 are set so that an exit side numerical aperture is 0.032 at focal lengths from 45 mm to 144 mm. At focal lengths from 144 mm to 360 mm, the aperture stops S1 and S2 are kept open. Accordingly, the optical system is configured so as not to limit a pupil diameter of 14.4 mm of the objective lens system by the aperture stops S1 and S2 at the focal lengths from 144 mm to 360 mm. As a result, the optical system is capable of maintaining constant brightness on the image surface and preventing a light amount from being reduced at a marginal portion at the low magnification position.

The optical system according to the sixth embodiment satisfies the condition (1) through the condition (7), thereby being an optical system having a high vari-focal ratio and excellent aberration correcting performance.

In the optical system according to the sixth embodiment which is composed of the four lens units, an angle of incidence of the principal ray on the image surface is suppressed to approximately 2 degrees in any condition of the magnification change. In other words, the optical system is configured to be effective for suppressing color shading which is a phenomenon characteristic of a CCD device.

Furthermore, the first lens unit of the optical system according to the sixth embodiment is configured to satisfy the condition (8). Accordingly, the second lens unit can have a short moving distance which is preferable also for layout of the lens units. Though a composition of the objective lens system is not described in the numerical data, the pupil of the objective lens system has a diameter of 14.4 mm and a distance as measured from the pupil of the objective lens system to the first lens unit of the zoom photographic optical system is set at 121 mm.

Figure 23:
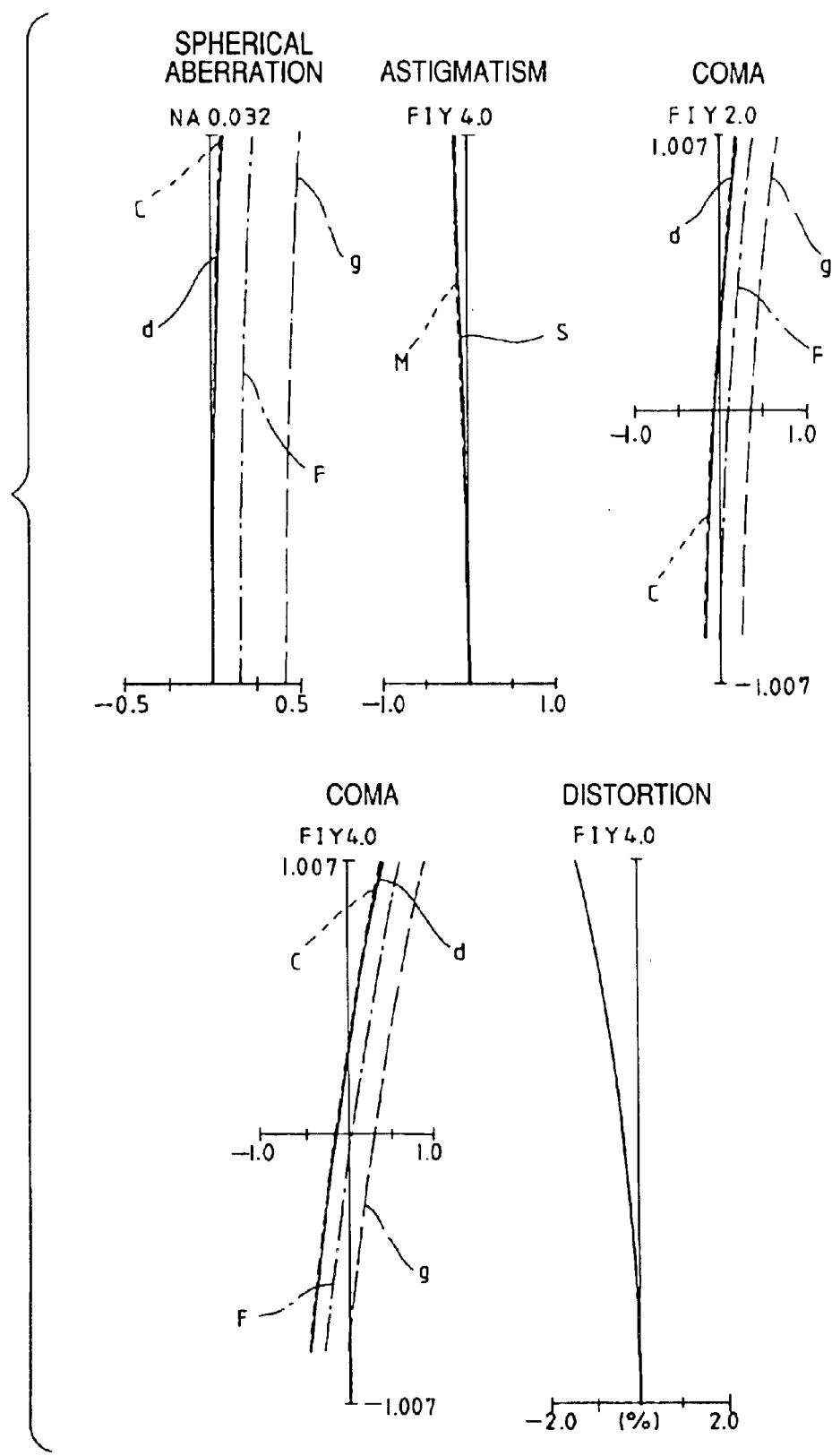
FIG. 23 shows curves illustrating aberrations produced by the sixth embodiment at a focal length of 45 mm.
Figure 24:
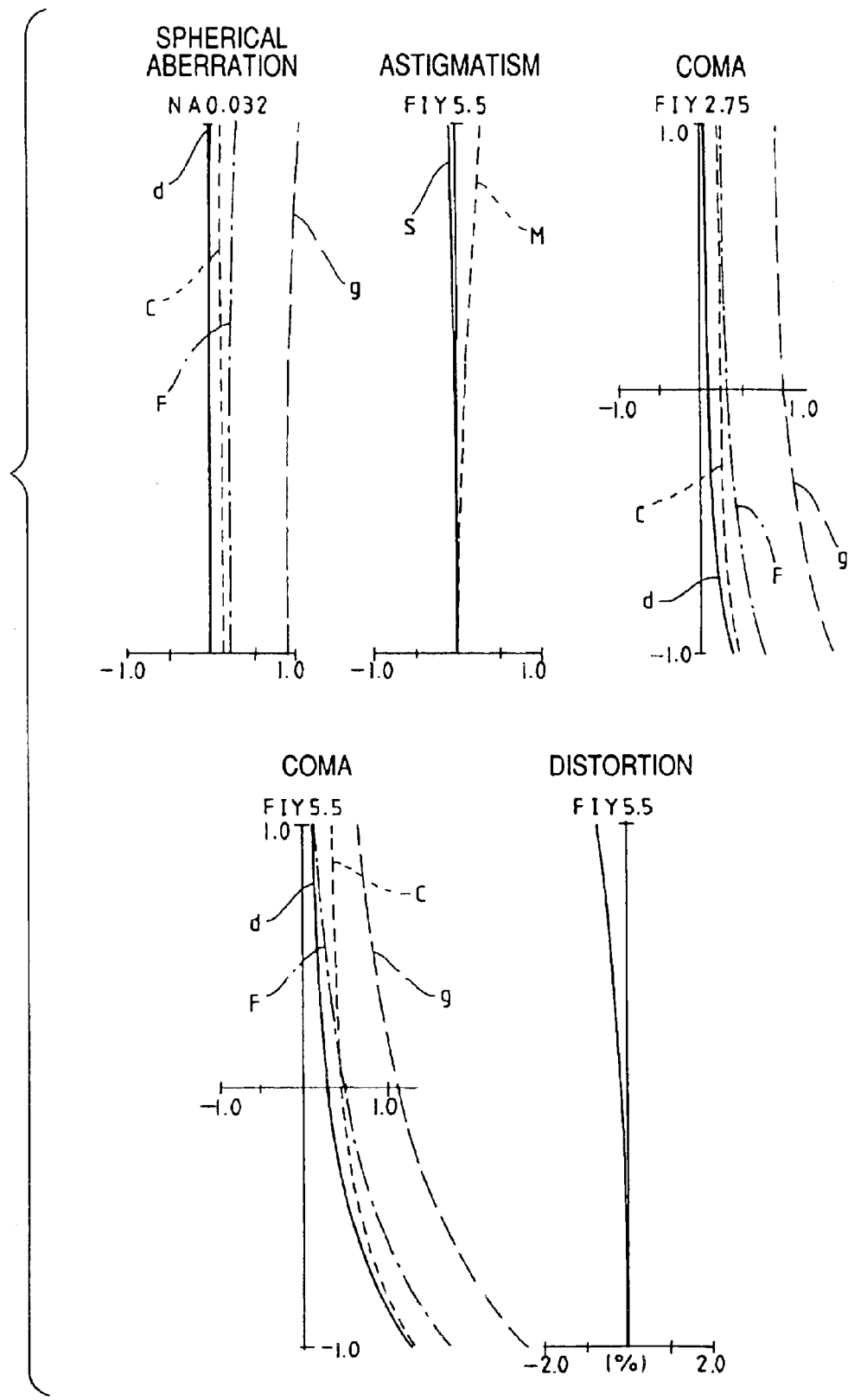
FIG. 24 shows curves illustrating aberrations produced by the sixth embodiment at a focal length of 144 mm.
Figure 25:
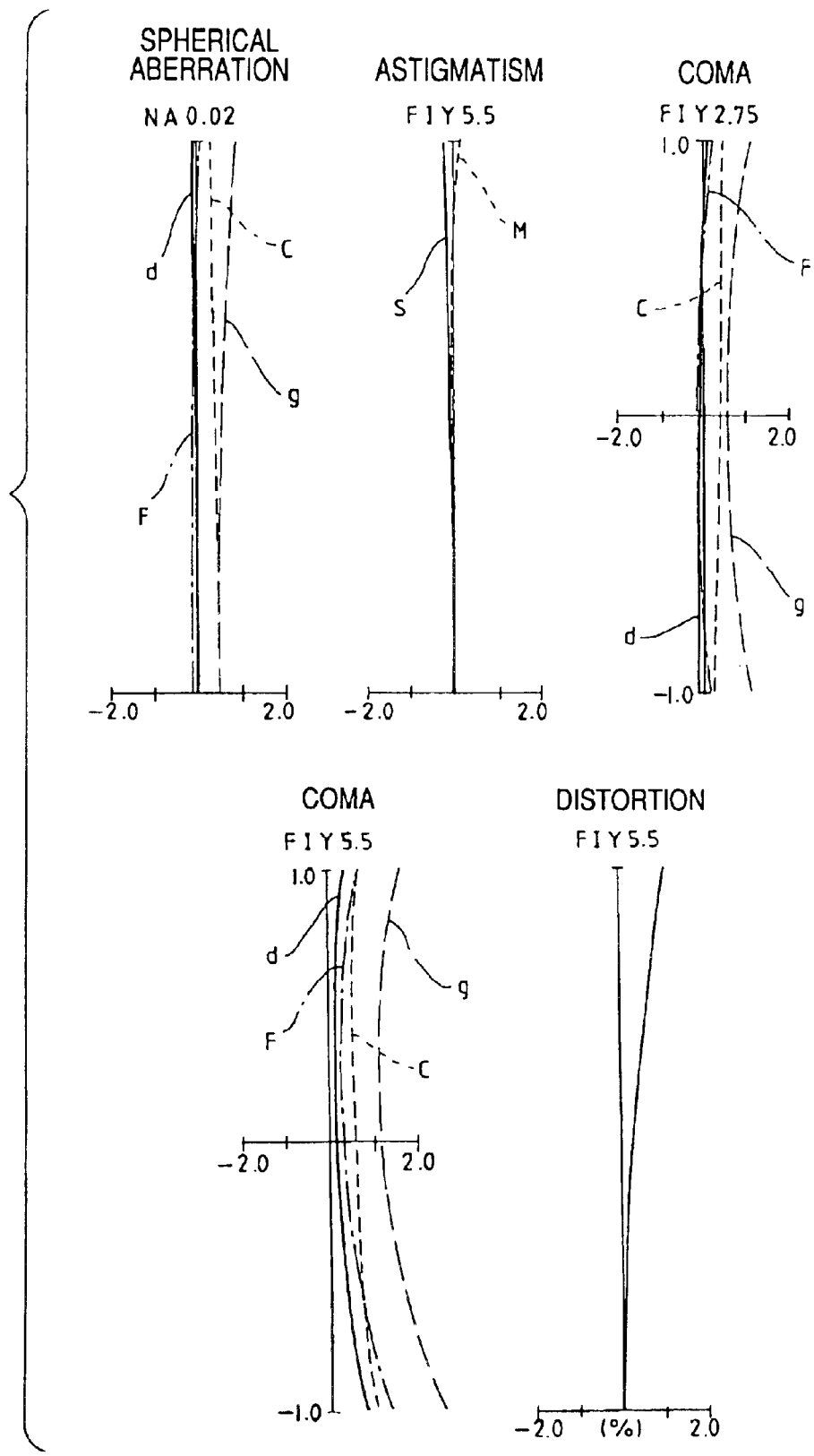
FIG. 25 shows curves illustrating aberrations produced by the sixth embodiment at a focal length of 360 mm.

Aberration characteristics of the optical system according to the sixth embodiment are illustrated in FIG. 23 (at the focal length of 45 m), FIG. 24 (at the focal length of 144 mm) and FIG. 25 (at the focal length of 360 mm) respectively.

Figure 7A:
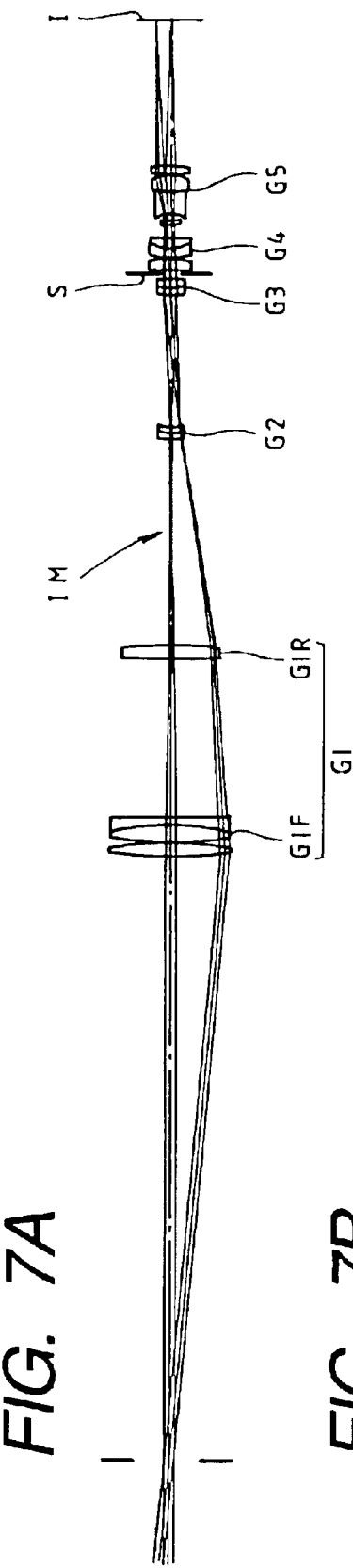
FIG. 7A, FIG. 7B and FIG. 7C are sectional views showing a composition of a seventh embodiment of the present invention.
Figure 7B:
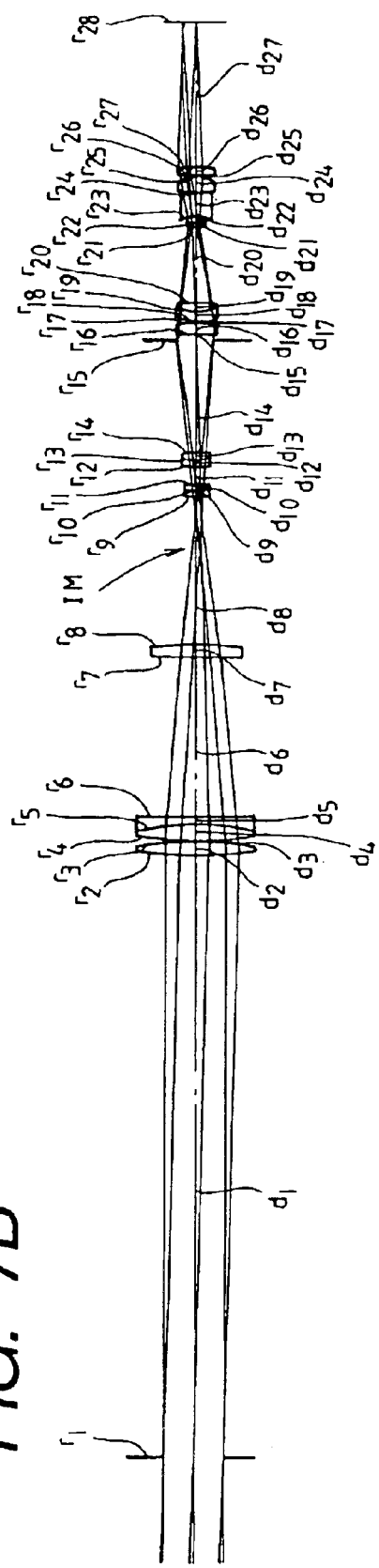
Figure 7C:
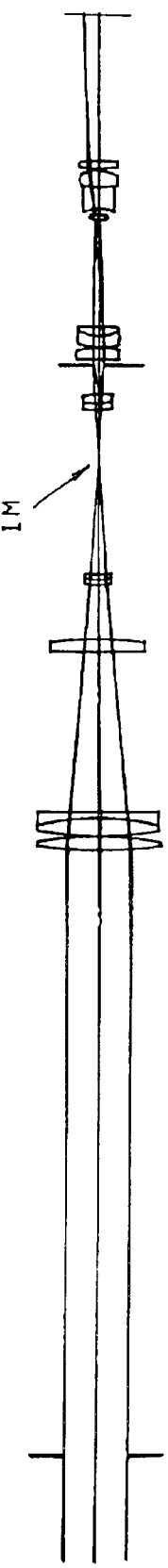

A zoom photographic optical system according to the seventh embodiment has a composition shown in FIG. 7A, FIG. 7B and FIG. 7C. Speaking concretely, the zoom photographic optical system consists, in order from a rear side of an objective lens system, of a first lens unit G1 having positive refractive power, a second lens unit G2 having negative refractive power, a third lens unit G3 having positive refractive power, a fourth lens unit having positive refractive power and a fifth lens unit G5 having negative refractive power. For changing a magnification from a low magnification position to a high magnification position, the second lens unit G2, the third lens unit G3 and the fourth lens unit G4 are moved along an optical axis. When these lens units are moved, an airspace between the first lens unit G1 and the second lens unit G2 is narrowed, an airspace between the second lens unit G2 and the third lens unit G3 is first narrowed and then widened, an airspace between the third lens unit G3 and the fourth lens unit G4 is first widened and then narrowed, and an airspace between the fourth lens unit G4 and the fifth lens unit G5 is widened.

In the optical system according to the seventh embodiment, the first lens unit G1 is composed of a front subunit G1F consisting of a convex lens component and a positive cemented lens component having weak power which consists of a convex lens element and a concave lens element, and a rear subunit G1R consisting of a positive lens component. The second lens unit G2 is composed of a cemented meniscus lens component which consists of a negative meniscus lens element and a positive meniscus lens element. Furthermore, the third lens unit G3 is composed of a positive cemented lens component which consists of a negative meniscus lens element and a convex lens element. The fourth lens unit G4 is composed of a positive meniscus lens component and a positive cemented lens component which consists of a negative meniscus lens element and a convex lens element. Furthermore, the fifth lens unit G5 is composed of a biconcave lens component, a negative cemented meniscus lens component which consists of a biconcave lens element and a positive lens element, and a positive meniscus lens component.

In the optical system according to the seventh embodiment, a location conjugate with a pupil of the objective lens system is situated between the third lens unit G3 and the fourth lens unit G4. An aperture stop S is disposed in the vicinity of the location conjugate with the pupil. Furthermore, the aperture stop S is moved together with the fourth lens unit G4 along the optical axis for the magnification change.

The optical system according to the seventh embodiment moves the second lens unit G2, the third lens unit G3 and the fourth lens unit G4 for the magnification change as described above and shown in FIG. 7A (the low magnification position), FIG. 7B (an intermediate magnification) and FIG. 7C (the high magnification position). By this magnification change, a focal length is changed from 45 mm (the low magnification position) to 180 mm (the intermediate magnification) and further to 900 mm (the high magnification position). In addition, a field number is 8 at the focal length of 45 mm or 11 at other focal lengths. Furthermore, a diameter of the aperture stop S is set so that an exit side numerical aperture is 0.032 at focal lengths from 45 mm to 180 mm. The aperture stop S is kept open at focal lengths from 180 mm to 900 mm. Accordingly, the optical system is configured so as not to limit an aperture diameter of 17.09 mm of the objective lens system by the aperture stop. As a result, the optical system is capable of maintaining constant brightness and preventing a light amount from being reduced at a marginal portion on an image surface at the low magnification position.

In the optical system according to the seventh embodiment in which the third lens unit has a short moving distance, an angle of incidence of the principal ray on an image surface I is limited within approximately 2 degrees. In other words, this optical system is configured to be effective for preventing color shading which is a phenomenon characteristic of a CCD device.

Though a composition of the objective lens system is not described in the numerical data of the seventh embodiment, the pupil of the objective lens system has a diameter of 17.09 mm and a distance as measured from the pupil of the objective lens system to the first lens unit G1 is 171 mm.

Figure 26:
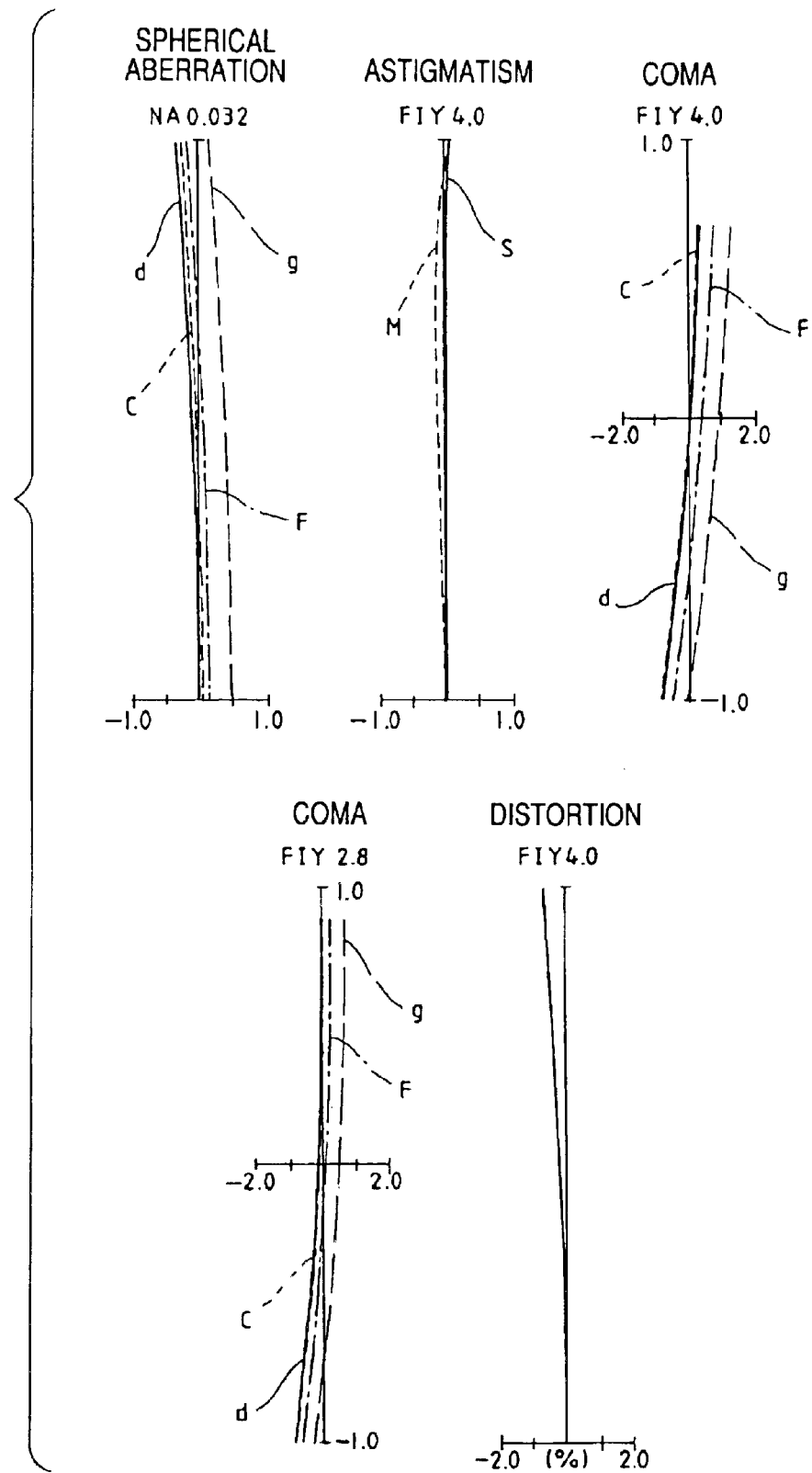
FIG. 26 shows curves illustrating aberrations produced by the seventh embodiment at a focal length of 45 mm.
Figure 27:
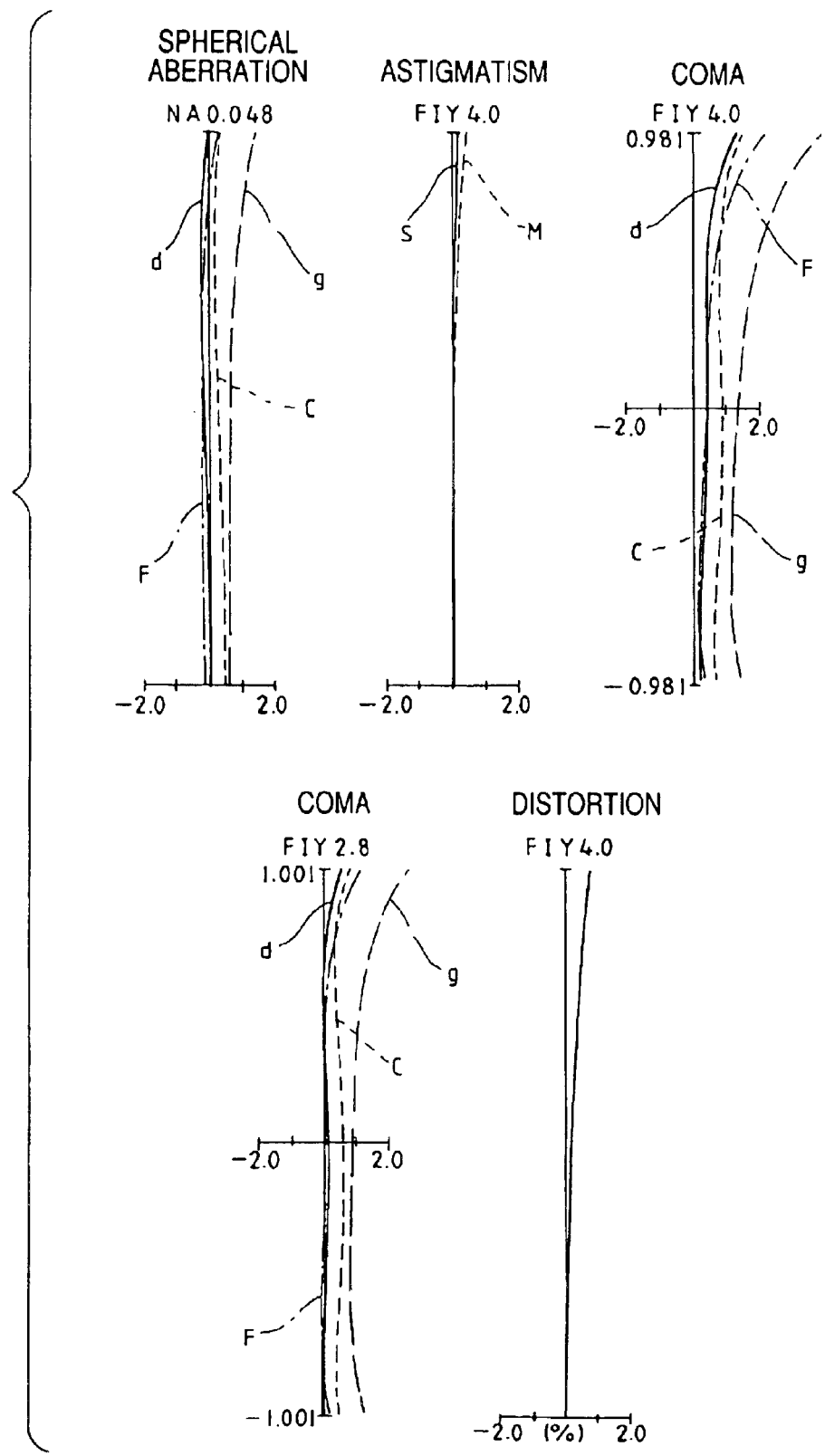
FIG. 27 shows curves illustrating aberrations produced by the seventh embodiment at a focal length of 180 mm.
Figure 28:
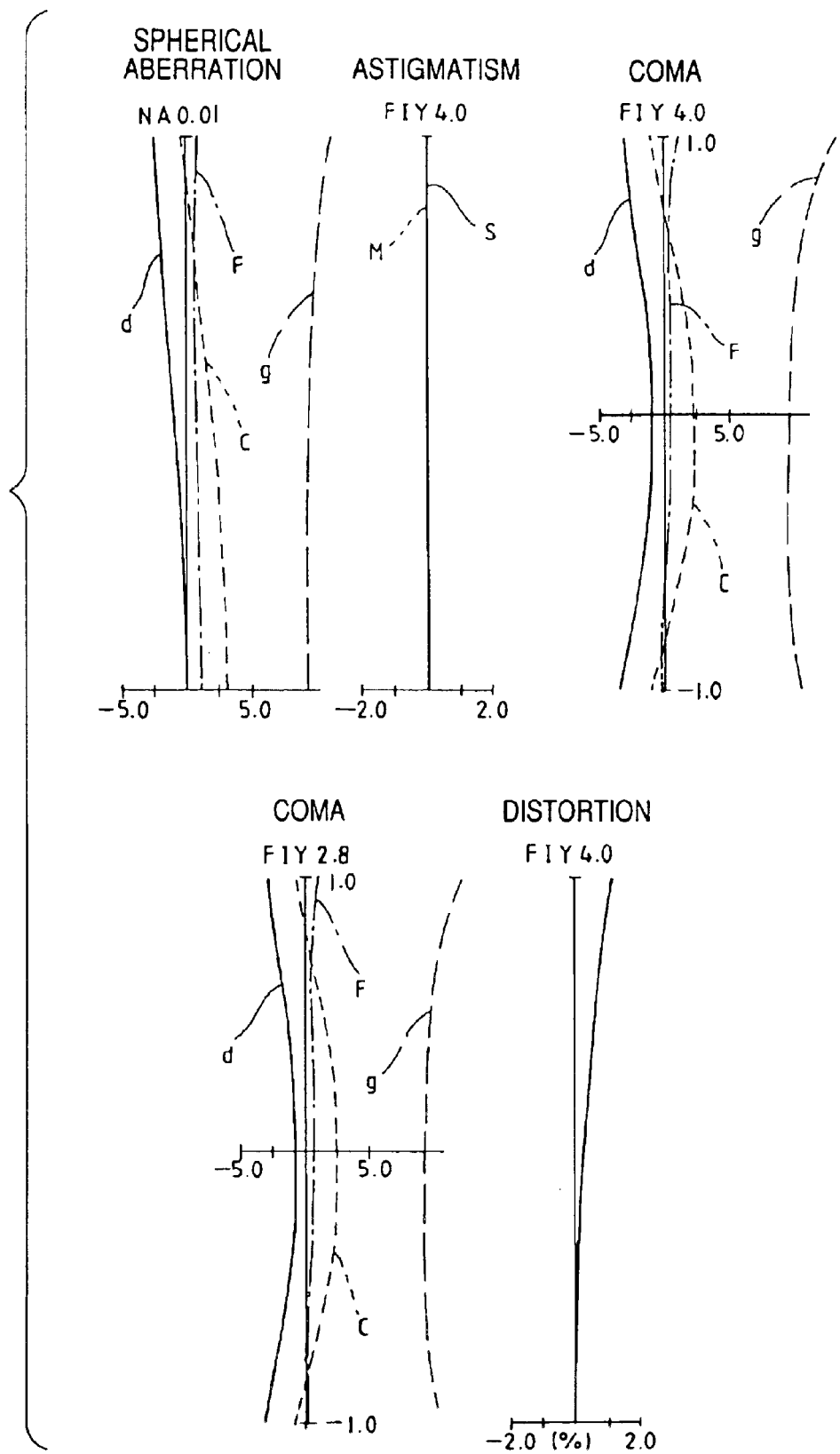
FIG. 28 shows curves illustrating aberrations produced by the seventh embodiment at a focal length of 900 mm.

Aberration characteristics of the optical system according to the seventh embodiment are illustrated in FIG. 26 (at the focal length of 45 mm), FIG. 27 (at the focal length of 180 mm) and FIG. 28 (at the focal length of 900 mm).

In addition, a reference symbol FIY used in the numerical data of each embodiment represents an image height.

Each of the zoom photographic optical system according to the first, second, third and seventh embodiments can be used in combination with an objective lens system which has, for example, a magnification of 20×, a focal length of 9 mm and a numerical aperture of 0.9. In this case, a total magnification is 5× and a numerical aperture is 0.16 at the low magnification position. Furthermore, a total magnification is 10× and a numerical aperture is 0.9 at the high magnification position. This optical system makes it possible to observe and photograph an object at total magnifications from 5× to 100× and with numerical apertures from 0.16 to 0.9.

Moreover, the aperture stop S is capable of preventing eclipse at the low magnification position, thereby enhancing aberration correcting performance. Furthermore, the optical system is configured to prevent an angle of the principal ray incident on an image pickup surface from exceeding 2 degrees, thereby being capable of favorably photographing an image free from shading on an image pickup device such as a CCD device.

What is claimed is:

1. A zoom photographic optical system to be used in an optical apparatus equipped with an objective lens system for forming a final image of a specimen comprising, in order from a rear side of said objective lens system, at least; a first lens unit having positive refractive power; a second lens unit having negative refractive power; and a third lens unit having positive refractive power, wherein said second lens unit and said third lens unit are moved along an optical axis for changing a magnification from a low magnification position to a high magnification position so that an airspace between the first lens unit and the second lens unit is narrower at the high magnification position than that at the low magnification position and an airspace between the second lens unit and the third lens unit is wider at the high magnification position than that at the low magnification position, wherein an intermediate image is formed between the first lens unit and the second lens unit at the low magnification position, and wherein the zoom photographic optical system satisfies the following conditions (1) and (2):

$$1 \leq FH/FL \leq 3 \quad (1)$$

$$3 \leq MGH/MGL \leq 20 \quad (2)$$

wherein a reference symbol FH represents a focal length of lens units as a whole as counted from the first lens unit to another lens unit disposed just before the intermediate image at the high magnification position, a reference symbol FL designates a focal length of lens units as a whole as counted from the first lens unit to another lens unit disposed just before the intermediate image at the low magnification position, a reference symbol MGH denotes a magnification of lens units as a whole which are disposed between the intermediate image and the final image at the high magnification position, and a reference symbol MGL represents a magnification of lens units as a whole which are disposed between the intermediate image and the final image at the low magnification position.

2. The zoom photographic optical system according to claim 1 satisfying the following conditions (3), (4) and (5):

$$0.3 < D_1/Do < 0.7 \quad (3)$$

$$0.15 < D_2/Do < 0.7 \quad (4)$$

$$0 < FB/Do < 0.3 \quad (5)$$

wherein a reference symbol $D_0$ represents a distance as measured from a surface of the first lens unit whichever is nearest the objective lens system to the final image, a reference symbol $D_1$ designates a distance as measured from the surface of the first lens unit whichever is nearest the objective lens system to the intermediate image at the low magnification position, a reference symbol $D_2$ denotes a distance for which the second lens unit is moved for changing the magnification from the low magnification position to the high magnification position, and a reference symbol FB represents a distance as measured from a surface of a lens element whichever is nearest the final image to the final image.

3. The zoom photographic optical system according to claim 1, wherein an image conjugate with a pupil of said objective lens system is formed between said intermediate image and final image, wherein an aperture stop is disposed at a location of said conjugate image, and wherein a diameter of said aperture stop is varied.

4. The zoom photographic optical system according to claim 3, wherein said first lens unit consists of a plurality of lens components including at least a cemented lens component consisting of a positive lens element and a negative lens element, wherein a lens unit which is nearest said final image comprises at least a negative lens element having a surface concave toward said intermediate image and negative refractive power, and wherein said zoom photographic optical system satisfies the following conditions (6) and (7):

$$\nu P - \nu N \geq 30 \quad (6)$$

$$Gn \geq 1.6 \quad (7)$$

wherein a reference symbol $\nu P$ represents an Abbe's number of the positive lens element of the cemented lens component disposed in the first lens unit, a reference symbol $\nu N$ designates an Abbe's number of the negative lens element of the cemented lens component disposed in the first lens unit and a reference symbol Gn denotes a refractive index of the lens element having the surface concave toward the intermediate image and the negative refractive power.

5. The zoom photographic optical system according to claim 4, wherein said first lens unit consists of a front subunit and a rear subunit, and wherein said zoom photographic optical system satisfies the following condition (8):

$$0.3 < D_{11}/D_1 < 0.8 \quad (8)$$

wherein a reference symbol $D_{11}$ represents a space between said front subunit and said rear subunit.

6. The zoom photographic optical system according to claim 1, wherein a fourth lens unit having negative refractive power is disposed on the image side of said third lens unit having the positive refractive power.

7. The zoom photographic optical system according to claim 1, wherein a fourth lens unit having positive refractive power is disposed on the image side of said third lens unit having the positive refractive power.

8. The zoom photographic optical system according to claim 1, wherein disposed on the image side of said third lens unit having the positive refractive power are a fourth lens unit having positive refractive power and a fifth lens unit having positive refractive power in order from a side of the objective lens system.

9. The zoom photographic optical system according to claim 1, wherein disposed on the image side of said third lens unit having the positive refractive power are a fourth lens unit having positive refractive power and a fifth lens unit having negative refractive power in order from the side of the objective lens system.

* * * * *